US006934335B2

(12) United States Patent
Liu et al.

(10) Patent No.: US 6,934,335 B2
(45) Date of Patent: Aug. 23, 2005

(54) VIDEO ENCODER WITH EMBEDDED SCENE CHANGE AND 3:2 PULL-DOWN DETECTIONS

(75) Inventors: Ming-Chang Liu, San Jose, CA (US); Wei-Jen Li, Fremont, CA (US); Ikuo Tsukagoshi, Sunnyvale, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 509 days.

(21) Appl. No.: 10/014,966

(22) Filed: Dec. 11, 2001

(65) Prior Publication Data

US 2002/0150160 A1 Oct. 17, 2002

Related U.S. Application Data

(60) Provisional application No. 60/254,804, filed on Dec. 11, 2000, provisional application No. 60/254,809, filed on Dec. 11, 2000, and provisional application No. 60/254,953, filed on Dec. 11, 2000.

(51) Int. Cl.[7] .................................................. H04N 7/12
(52) U.S. Cl. ............. 375/240.16; 375/240; 375/240.01; 375/240.12
(58) Field of Search ........................... 375/240.16, 240, 375/240.01, 240.12, 240.18

(56) References Cited

U.S. PATENT DOCUMENTS

| 5,638,129 A | * | 6/1997 | Lee | 375/240.16 |
| 6,058,140 A | * | 5/2000 | Smolenski | 375/240.16 |
| 6,574,278 B1 | * | 6/2003 | McVeigh et al. | 375/240.18 |

OTHER PUBLICATIONS

R.J. Schutten, et al., "Real–Time 2–3 Pull–Down Elimination Applying Motion Estimation/Compensation in a programmable Device", IEEE Transactions on Consumer Electronics, vol. 44, No. 3, Aug. 1998, pp. 930–938.

M.C. Chen, et al., "A High Accuracy Predictive Logarithmic Motion Estimation Algorithm for Video Coding", IEEE 1995, pp. 617–620.

* cited by examiner

Primary Examiner—Allen Wong
(74) Attorney, Agent, or Firm—Blakely, Sokoloff, Taylor & Zafman LLP

(57) ABSTRACT

In one embodiment, a video encoder having a first and second phase of motion estimation, and scene change and 3:2 pull-down detection components is provided. In another embodiment, the first phase of motion estimation determines a set of field motion vectors to execute the scene change and 3:2 pull-down detection components. In another embodiment, the scene change and 3:2 pull-down detection component, and the second phase of the motion estimation occur after the first phase of motion estimation.

17 Claims, 28 Drawing Sheets

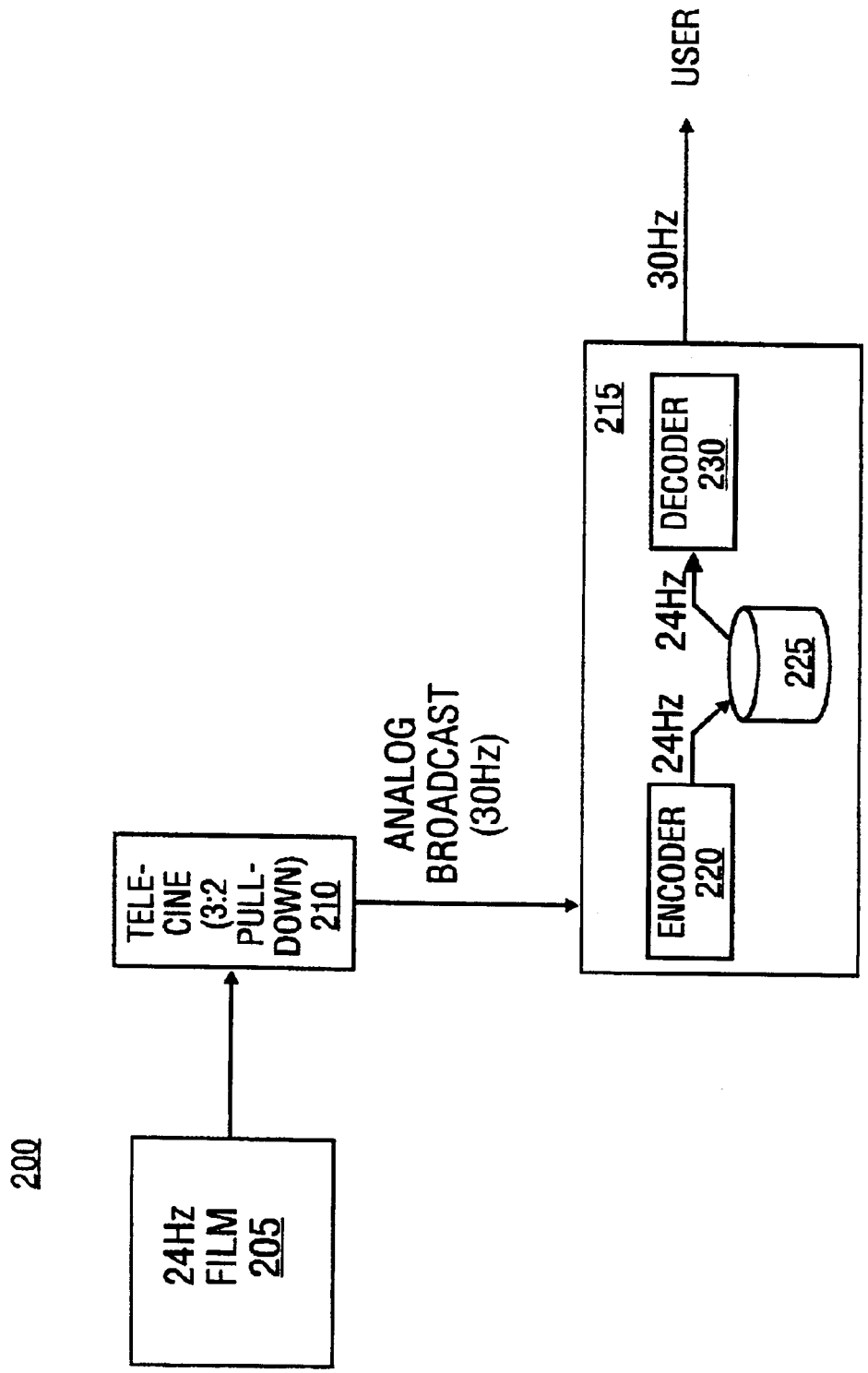

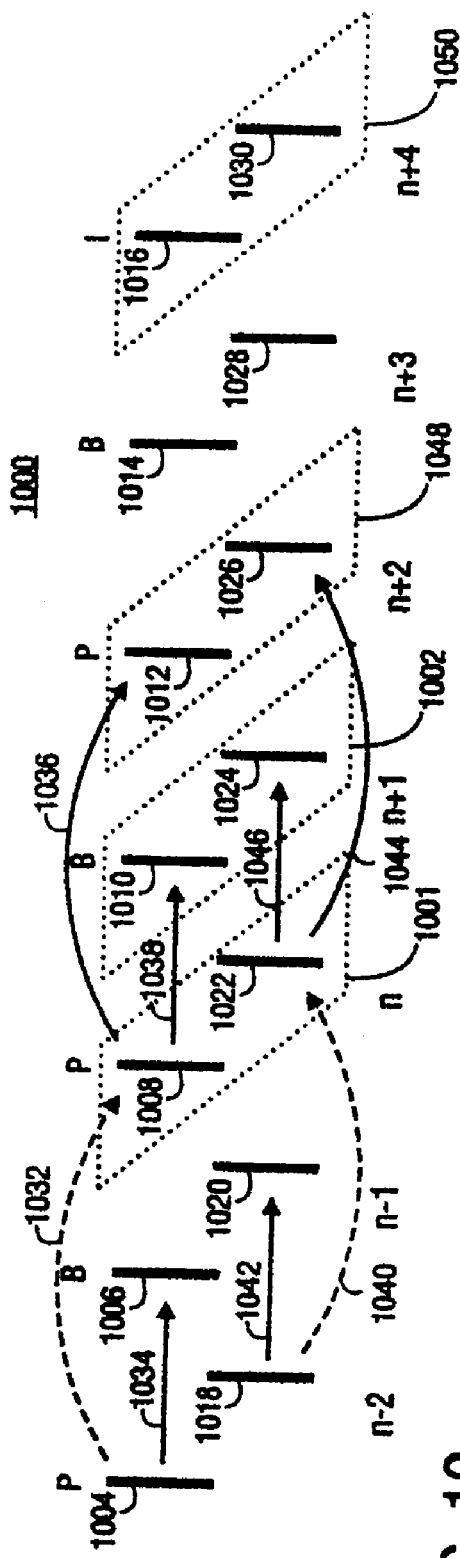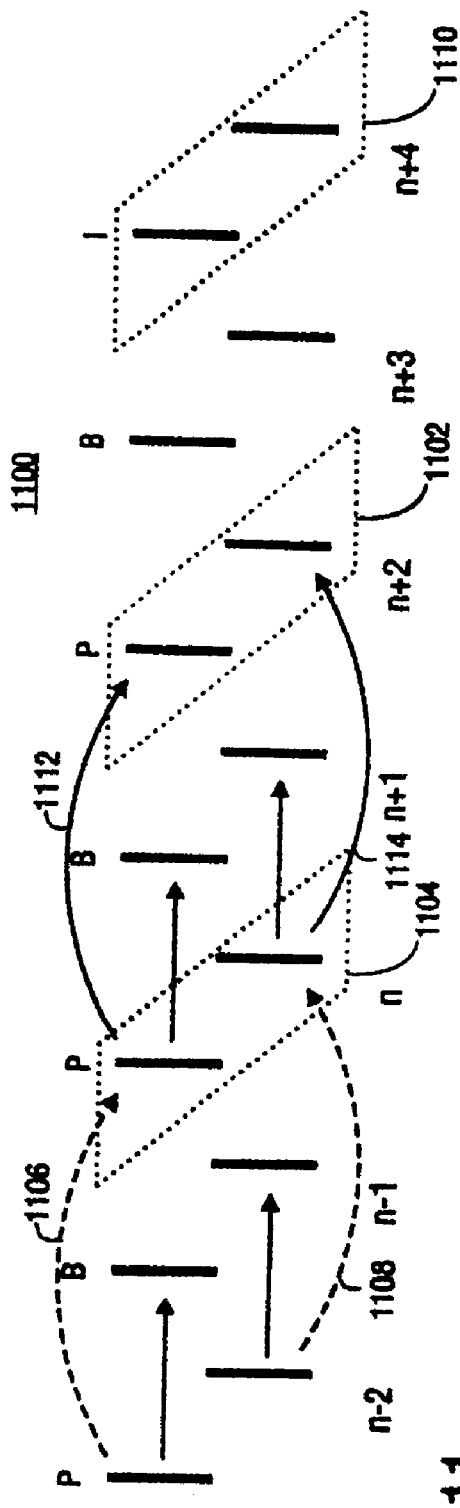
FIG. 10
FIG. 11

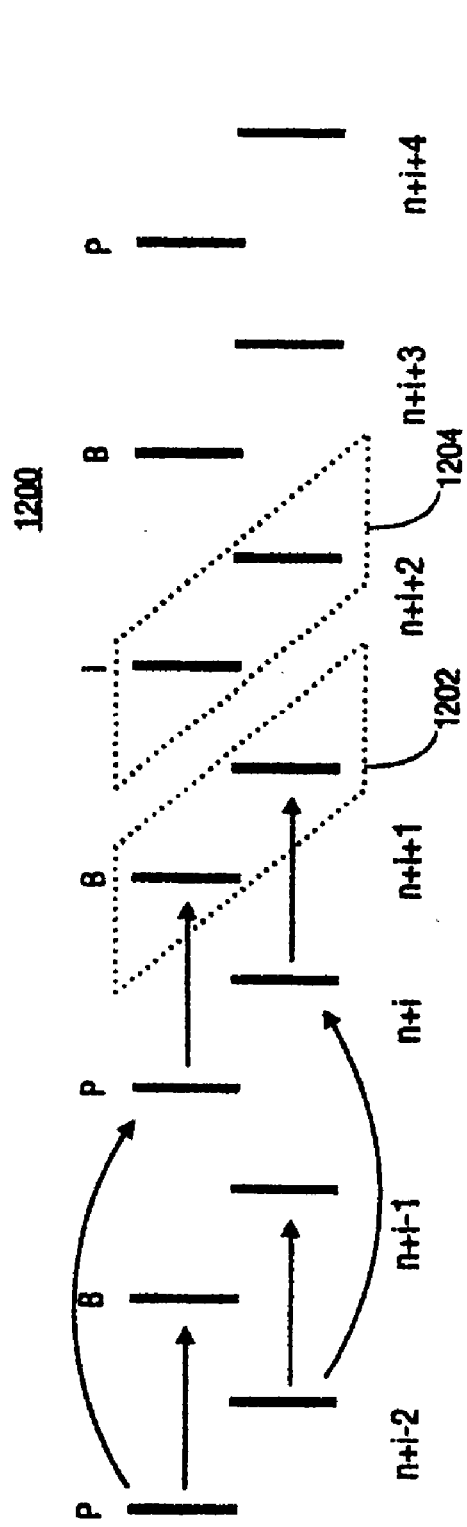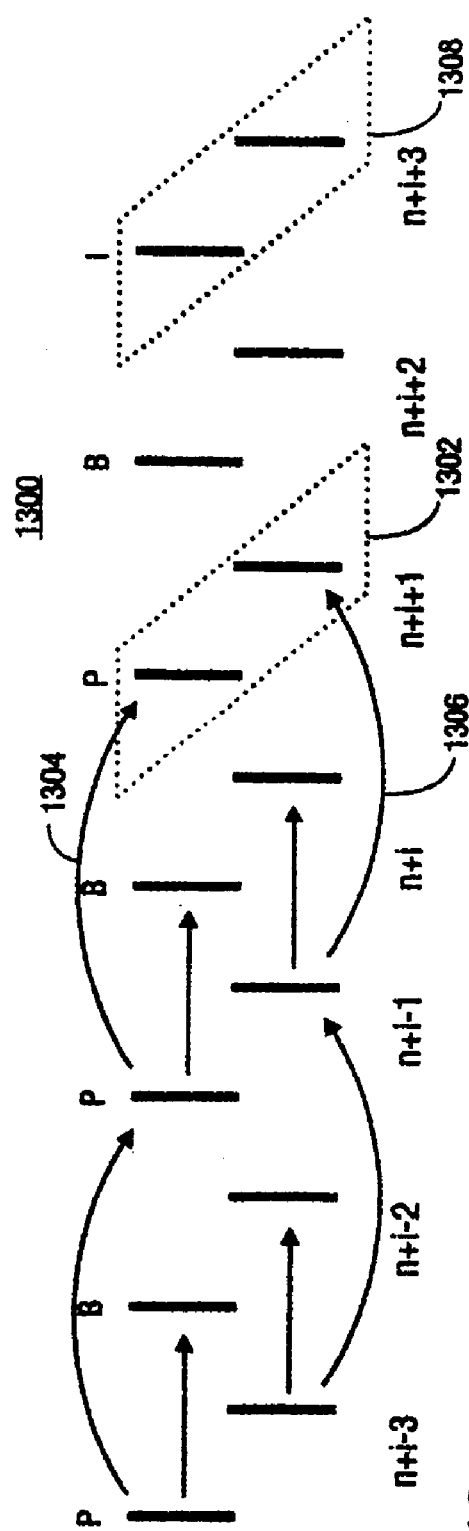

VIDEO ENCODER WITH EMBEDDED SCENE CHANGE AND 3:2 PULL-DOWN DETECTIONS

RELATED APPLICATIONS

The present application claims the benefit of U.S. provisional patent applications Ser. Nos. 60/254,804, 60/254,953 and 60/254,809, all filed on Dec. 11, 2000.

FIELD OF THE INVENTION

The present invention relates to devices and methods for efficiently encoding digital video.

RELATED ART

One type of film runs at 24 Hz. That is, twenty four frames of film are displayed every second. In the United States, according to the National Television System Committee (NTSC) standards, television video runs at 30 Hz. When converting film to be shown on television, problems arise because of the extra frames needed for every second of television broadcast. More specifically, there are six more frames of television video every second than corresponding film frames, and in order to display film on television with proper timing something must be done to fill in the last six frames. Further, according to the NTSC standard, television video is interlaced. That is, every frame is further made up of two fields, a top field and a bottom field. So, for every second, 60 fields of video are shown.

In order to solve the problem of having extra video frames when converting film to be shown on television, the 3:2 pull down process converts two frames of film into five fields of video. One method of performing this process involves repeating one of the fields. More specifically, this method involves converting the two frames of film into two frames of video, each frame of video having two fields, and then repeating one of the video fields to correct the timing.

Digitally encoded video is typically compressed because video can require an enormous amount of digital storage if left uncompressed. One method for compressing digital video involves using the standards of the Moving Pictures Experts Group (MPEG). The MPEG-2 standard calls for three types of frames to be encoded. Intra-frames, or I-frames are encoded in the same manner as still images; an I-frame contains information sufficient to display an entire image. Predictive frames, or P-frames use previous reference frames to determine what the current frame will be by recording changes between a previous frame and the current frame. Bi-directional frames, or B-frames use previous and subsequent reference frames to determine what the current frame will be. P-frames and B-frames use motion vectors to encode frames.

A motion vector determines movement between specific areas of one frame to another frame. For example, a P-frame may be encoded by referencing an I-frame immediately preceding it. Motion vectors between the P-frame and the I-frame instruct a decoder to display the P-frame by using motion vectors to determine movement of certain areas within the I-frame which results in the proper display of the P-frame.

More specifically, each frame can be divided up into a number of macroblocks. A macroblock is a group of pixels; for example a macroblock could be a square 16 pixels by 16 pixels. A motion vector can then record the movement of a macroblock in a first frame to its new position in a second frame. For example, a macroblock in a first frame could be a black 16 by 16 pixel square in the lower left hand corner. In the second frame, the black square may move to the upper right hand corner of the frame. Instead of recording the characteristics of the black square in the second frame, the second frame can instead have a motion vector indicating that the black square, which was in the lower left hand corner in the first frame, has moved to the upper right hand corner in the second frame. Since a macroblock will generally contain much more data information than a motion vector which indicates the direction of movement of a previously encoded macroblock, motion vectors can greatly reduce the amount of data necessary for digital video.

One method of encoding digital video calls for grouping frames together into what are known as Groups of Pictures (GOPs). A GOP may begin with an I-frame, and have P-frames and B-frames which refer to the I frame. A P-frame or a B-frame can refer to either an I-frame or a P-frame, but not to a B-frame. The length and order of GOPs can be determined before encoding or dynamically, while the encoder is encoding. An example of a sequence of a GOP may be IBBPBBPBBI, meaning an I-frame, followed by two B frames, a P frame, two more B-frames, another P-frame, two more B-frames, and an I-frame. In an encoder which determines the order of a GOP prior to encoding, this sequence would repeat itself. In the above sequence, the first P-frame will refer back to the first I-frame, since it cannot refer to a B-frame, and must refer to a frame that occurs before it. The B-frames may refer to any of the I- or P-frames.

One method of applying 3:2 pull down introduces a repeated field for every five fields of video. When encoding video, which at one time was film, the 3:2 pull down process leaves a repeated field as one out of every five fields. This repeated field can be detected and removed. By removing repeated fields, the encoding process can be made more efficient, and ultimately the amount of the resulting data can be greatly reduced. However, current methods for detecting repeated fields, such as pixel to pixel matching from field to field, can require too much processing time and too many resources. Therefore, an efficient and effective method for determining which fields are repeated is needed.

Further, it is advantageous for the encoder to be able to detect when a new scene is beginning in a video sequence. Current methods for detecting a scene change include histogram-based algorithms and block matching algorithms. These methods are very processor intensive, and generally cannot be used for real-time digital video encoding. Therefore, an efficient and effective method for detecting scene changes during digital video encoding is needed.

SUMMARY OF THE INVENTION

In one embodiment, a video encoder having a first and second phase of motion estimation, and scene change and 3:2 pull-down detection components is provided. In another embodiment, the first phase of motion estimation determines a set of field motion vectors to execute the scene change and 3:2 pull-down detection components. In another embodiment, the scene change and 3:2 pull-down detection component, and the second phase of the motion estimation occur after the first phase of motion estimation.

BRIEF DESCRIPTION OF THE DRAWINGS

FIG. 2 illustrates a system for encoding and decoding digital video according to one embodiment.

FIG. 10 illustrates a video sequence having a scene at a B-frame (immediate) right after an I-frame.

FIG. 11 illustrates a video sequence having a scene change occurring two frames after an I-frame.

FIG. 12 illustrates a video sequence having a scene change happening at a B-frame.

FIG. 13 illustrates a video sequence having a scene change occurring at a P-frame.

DETAILED DESCRIPTION

The present invention relates to devices and methods for efficiently encoding digital video. This invention may be used to increase efficiency when encoding video that has been processed using a 3:2 pull down process. Although the embodiments described below relate to encoding video that has been processed using a 3:2 pull down process, it is understood that the present invention may be used for any type of video.

Figure 1:
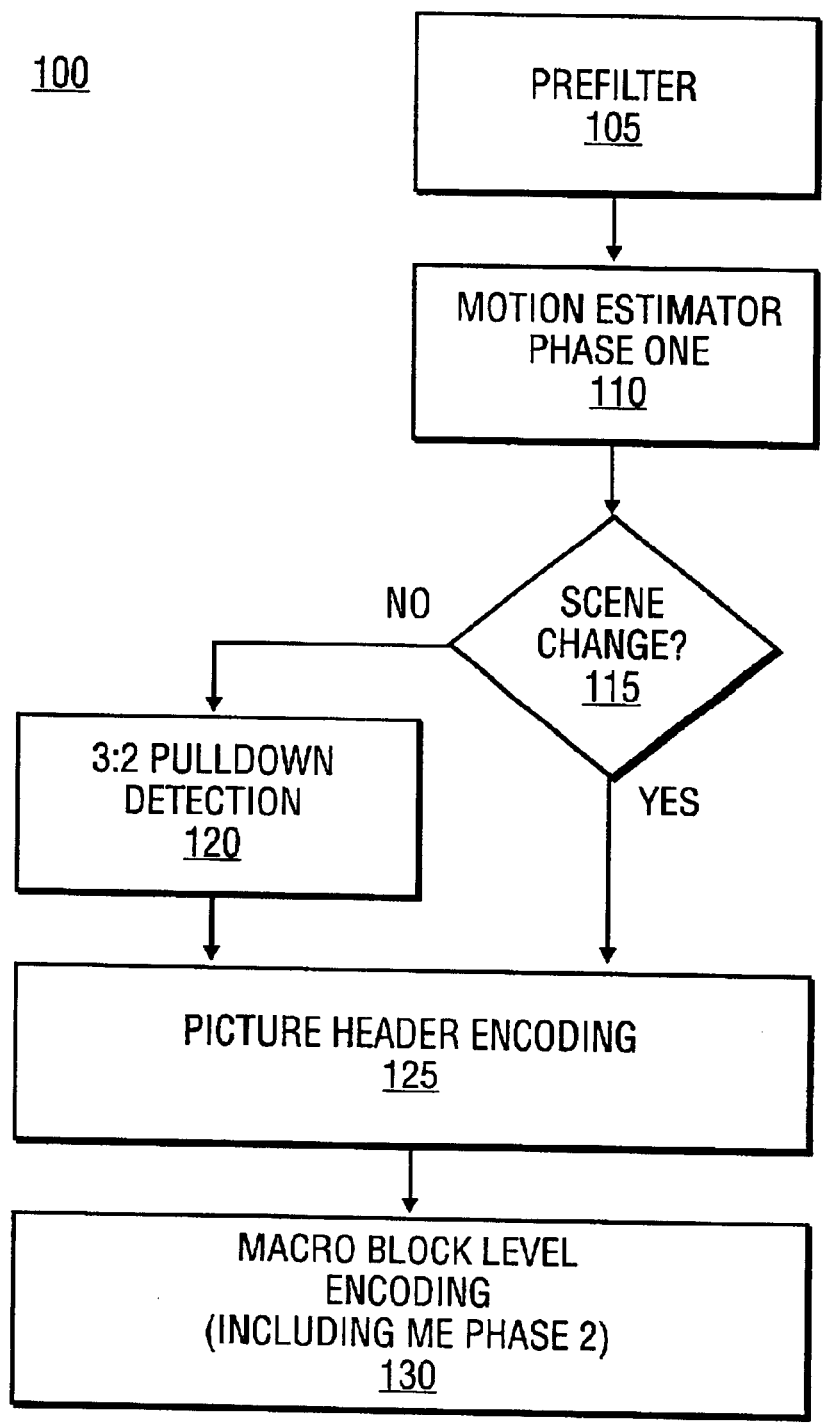
FIG. 1 is a flow diagram illustrating the process of a video encoder according to one embodiment.

FIG. 1 is a flow diagram illustrating the process of a video encoder according to one embodiment. The encoder accepts a video sequence as an input, and outputs a digitally encoded video bitstream. According to one embodiment, the video encoder encodes video according to an MPEG standard. The process illustrated in FIG. 1 is generally described; more detail will be added in figures following. It is understood that while the process of FIG. 1 illustrates one embodiment of the invention, there are numerous methods of encoding video, and one skilled in the art will realize that the features of FIG. 1 can be integrated into any number of different encoders.

At block 105, pre-filtered output is inputted into the video encoder. The pre-filtered output of block 105 is first sent to phase of a motion estimator in block 110. A motion estimator, which determines motion vectors to encode frames, is here split into two separate phases. Phase one of the motion estimator entails determining two sets of motion vectors, one set between the first field of a first frame and the first field of a second frame and another set between a second field of a first frame and a second field of a second frame. The second phase of the motion estimator determines the remaining motion vectors: those between the first field of the first frame and the second field of the second frame, those between the second field of the first frame and the first field of the second frame, and those between the first frame and the second frame. The motion vectors indicate motion of macroblocks between two different frames. In a standard interlaced video sequence in which one top field and one bottom field comprise a frame, the first phase of the motion estimator determines motion vectors between fields of the same polarity. That is, two top fields are said to have the same polarity, but a top field and a bottom field are said to have opposite polarity. The motion vectors between fields of the same polarity are also known as field motion vectors.

By bifurcating the motion estimation phase, the field motion vectors may be used in the scene change detection and 3:2 pull-down detection phases in blocks 115 and 120, respectively. The field motion vectors can be used during scene change detection and 3:2 pull-down detection to generate additional information for these detections such as histograms and fields difference calculations, rather than using more processor intensive methods. Because it is necessary to determine field motion vectors for each frame in order to encode the frame, using the field motion vectors to perform the detections may introduce little extra processing into the system. It may also be advantageous to bifurcate the motion estimation phase because the result of the detections may render the second phase of the motion estimation phase unnecessary, and if the second phase is found to be unnecessary, the encoder can forgo estimating of the remaining motion vectors, saving further processing resources.

Previous video encoders had to encode I- and P-frames before B-frames were encoded because a B-frame uses I- and P-frames as references, and can reference to a frame in the future. However, using a two phase motion estimation, an encoder can encode frames using the input sequence of frames.

At block 115, a scene change detection is executed. Scene change detection uses the field motion vectors found in block 110 to determine whether the scene has changed between two frames. Generally, if there is no scene change between frames, one can expect the motion vectors of a frame to be similar to the motion vectors of the frame before it. However, if there is a scene change between frames, the motion vectors will become unpredictable and erratic. By comparing these motion vectors, it can be determined that there has been a scene change. One embodiment of a scene change detection process will be explained in more detail below.

If a scene change is detected, the encoder can order the beginning of a new Group of Pictures (GOP) immediately or soon after the scene change. As explained above, whenever a scene change occurs, the first frame of the scene change will have motion vectors which are very erratic and large in magnitude. As a result, these motion vectors will not be of much use. It may therefore be advantageous to begin a new GOP with a new I-frame, so that frames at and after the scene change do not have to refer to frames in an earlier scene which may be very different. The encoder's response to the detection of a scene change will also be explained in more detail below.

If there is no scene change, the process then moves on to block 120, where 3:2 pull-down detection is executed. As explained above, the 3:2 pull-down process introduces one field out of every five that is repeated from another field. Because this repeated field is identical to another field, a processing and data storage savings can be realized by replacing the repeated field with a reference to the earlier field from which it is repeated.

The 3:2 pull-down detection process of block 120 involves using the field motion vectors determined by the first phase of the motion estimator in block 110 to determine whether there is a repeated field. Because motion vectors indicate the motion of macroblocks, if one field is repeated from another, any motion vectors between those two fields should theoretically have a magnitude of zero. In reality, there will always be some noise in any video system, but if the sum of the magnitudes of one set of field motion vectors is significantly greater than the sum of the magnitudes of the other set of field motion vectors, then the fields which are related by the smaller sum of magnitudes can be said to be repeated. For example, if the top fields in two frames are repeated, the sum of the magnitudes of the motion vectors relating the two top fields will be significantly less than the sum of the magnitudes of the motion vectors relating the bottom fields. This is explained in more detail below.

If a repeated field is found, the repeated field can be replaced by a reference to the previous field and encoding begins again by supplying new frames to the motion estimator. However, if there is no repeated field, the encoding process continues. If there is a scene change, the 3:2 pull down detection can be bypassed and the process moves on to picture heading encoding in block 125.

Once the step of block 125 is completed, the process moves on to macroblock level encoding in block 130. Macroblock level encoding, including the second phase of the motion estimator and the mode decision for the best motion vector for each macroblock, encodes a frame at macroblock basis. The second phase of the motion estimator includes determining the motion vectors between the first field of a first frame and the second field of a second frame, between the second field of a first frame and the first field of a second frame and between a first frame and a second frame. Macro-block level encoding at block 130 completes the encoding for a specific frame. Once encoding is completed, the next frame may be entered into the encoder and the process begins again.

Significant processing time can be saved by dividing the motion estimator into two discrete phases. The first phase, determining the first two sets of motion vectors, can be performed before the scene change detection, the 3:2 pull-down detection, and the second phase of the motion estimator. The results of the first phase can determine whether there is a scene change. Once a scene change is found it is no longer necessary to execute the 3:2 pull-down detection and the second phase of motion estimation. If there is no scene change detected, the 3:2 pull-down detection will be executed. If there is a repeated field, it need not be encoded, but a reference to the field it is repeated from can be inserted. Thus, the second phase motion estimation for a repeated field does not need to be executed. The processing resources saved from not encoding repeated fields can be used for encoding other frames to improve the quality of the video. Therefore, determining the field motion vectors first and using them to find repeated fields and scene changes can significantly reduce the amount of processing required and improve quality.

FIG. 2 illustrates a system for encoding and decoding digital video according to one embodiment. Film at 24 Hz 205 can be processed in a telecine 210 which performs 3:2 pull-down to create 30 Hz video. The 30 Hz video is transferred as an analog broadcast to an end user. A device, having a video code 215 may then process the 30 Hz analog broadcast. An encoder 220, takes the 30 Hz video and encodes it at 24 Hz by removing repeated fields as in the processes explained above. The video may then be stored on data source 225. Then, the 24 Hz encoded video may be decoded by decoder 230 and returned to 30 Hz video by inserting the repeated fields, which may be viewed by a user.

Figure 3A:
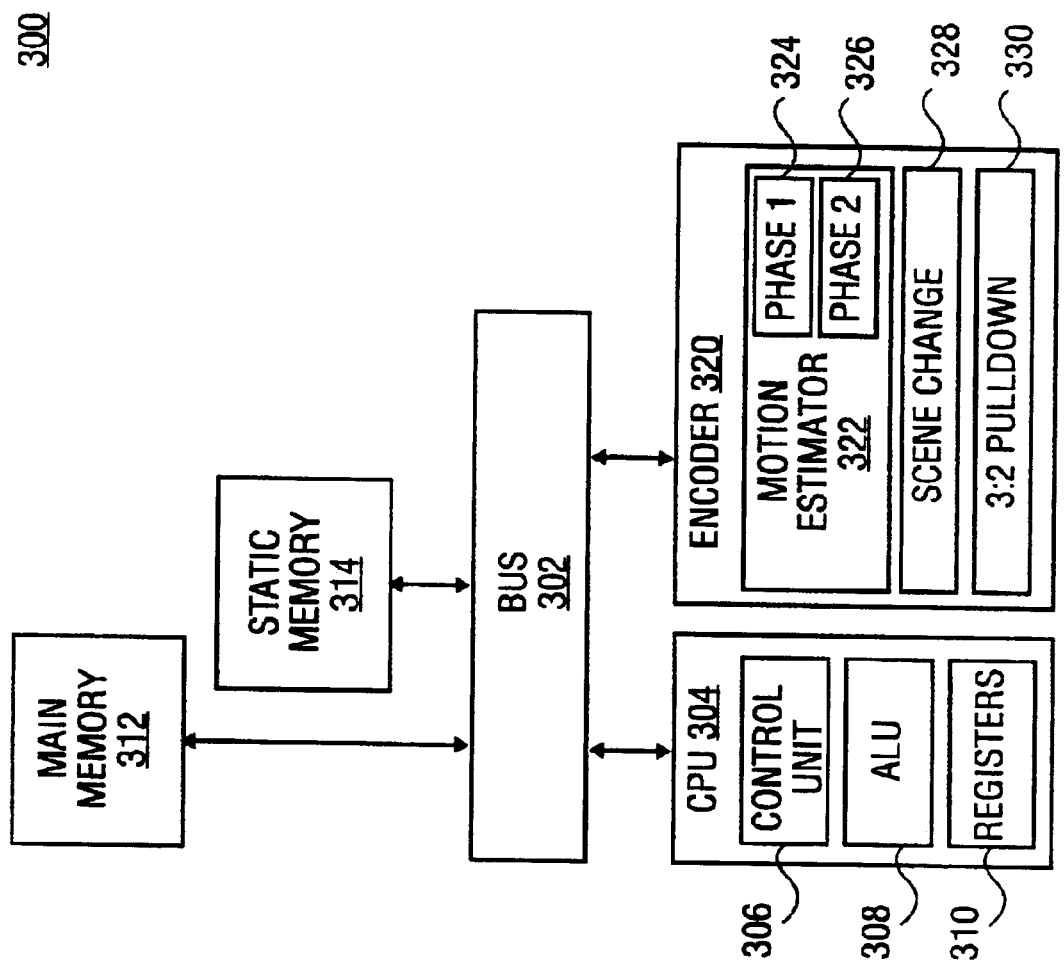
FIG. 3a illustrates a video encoder and associated hardware, according to one embodiment.

FIG. 3a depicts a processing system 300 in which one embodiment of the invention may be implemented. For one embodiment, a video encoding device may be implemented using a general processing architecture. Referring to FIG. 3a, the system may include a bus 302, or other communications means for communicating information, and a central processing unit (CPU) 304 coupled to the bus for processing information. CPU 304 includes a control unit 306, an arithmetic logic unit (ALU) 308 and registers 310. CPU 304 can be used to implement the video encoder and decoder. The processing system 300 also includes a main memory 312, which may be a random access memory (RAM) device that is coupled to the bus 302. The main memory stores information and instructions to be executed by CPU 304. Main memory 312 may also store temporary variables and other intermediate information during the execution of instructions by CPU 304. The system 300 also includes a static memory 314, for example, a read-only memory (ROM), and/or other static device that is coupled to the bus 302 for storing static information and instructions for CPU 304. It should be realized that processor executable instructions, reflective of the processes described herein may be stored in one of the memories referred to above and/or stored or transferred through some other computer readable medium.

The encoder 320 is coupled to the bus 302 and configured to encode digital video. The encoder 320 includes a motion estimator 322 having a first phase 324 and a second phase 326. The motion estimator is used to determine motion vectors. The first phase 324 of the motion estimator determines the field motion vectors as described above and below. The second phase 326 of the motion estimator determines the third, fourth, and fifth sets of motion vectors as described above and below. The encoder 320 further includes a scene change detection component 328 to detect scene changes between frames, as explained earlier and further below. Encoder 320 also includes a 3:2 pull down detection component 330 to detect whether there are repeated fields in any frames, as explained earlier and below. In one embodiment, the encoder operates in a manner as explained in the flow diagram in FIG. 1.

Figure 3B:
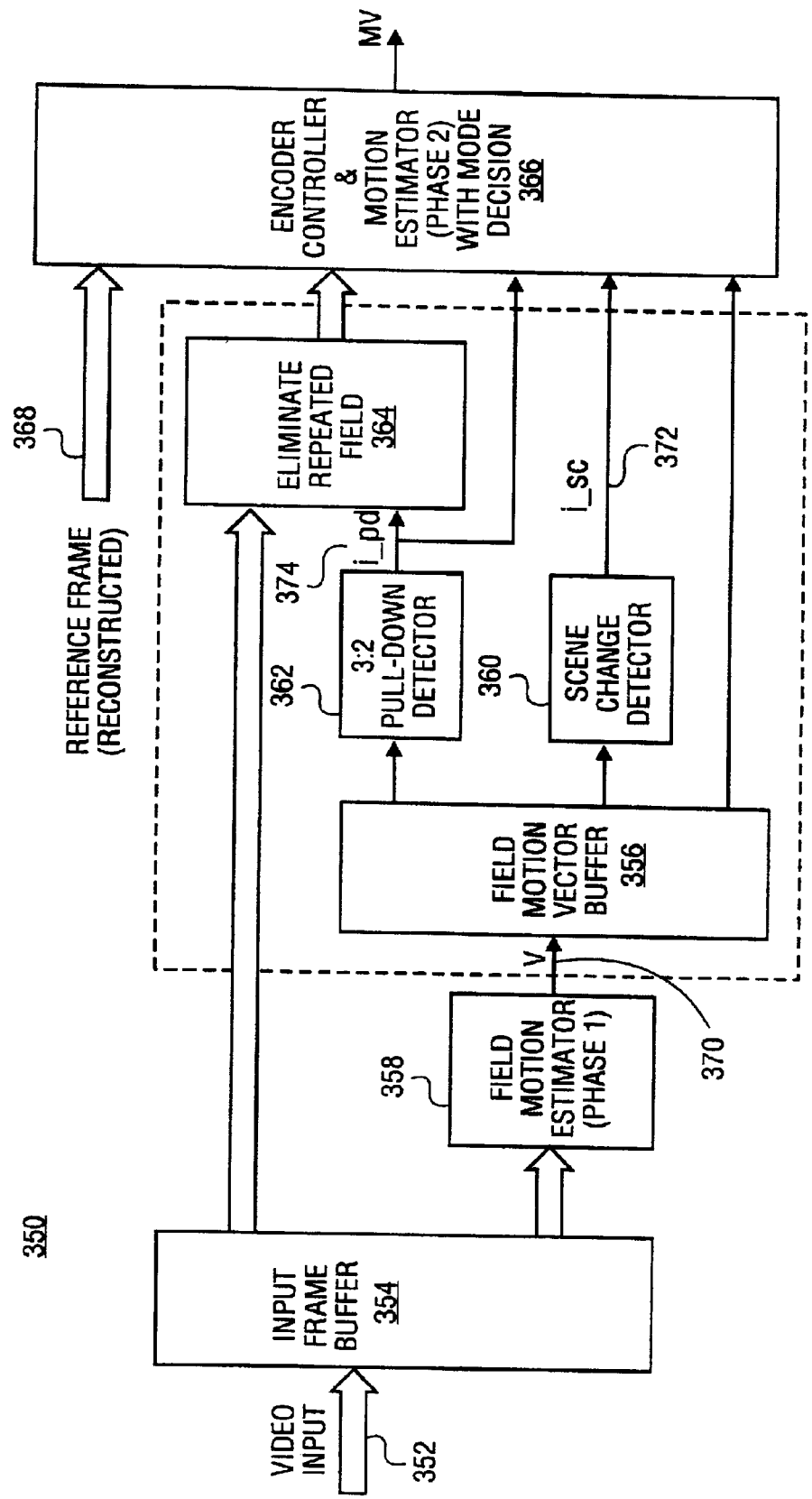
FIG. 3b illustrates an encoder according to one embodiment.

FIG. 3*b* illustrates an encoder 350 according to one embodiment. Frames are input at point 352 and saved into frame buffer 354 for motion estimation. The field motion vectors V 370 from phase-one motion estimator 358 are stored in field motion vector buffer 356 for scene change detector 360 and 3:2 pull-down detector 362 to use. The scene change detector 360 sends the detection outcome 372, an indicator i_sc, to inform encoder controller 366. The 3:2 pull-down detector 362 sends the detection outcome 374, and indicator i_pd, to inform the encoder controller 366 and to eliminate repeated field.

According to one embodiment, the flow of the encoder is explained above, in FIG. 1. Motion estimation phase 1 358 accepts inputted frames and computes field motion vectors for the inputted frames. As explained above, the phase 1 358 only computes the field motion vectors, which are the motion vectors between fields having the same polarity. Scene change detection component 360 uses the field motion vectors of phase 1 358 to determine whether a scene change exists. Depending on whether there is a scene change or not, the encoder may alter the encoding process, as explained below. 3:2 pull-down detection component 362 uses the field motion vectors outputted from phase 1 358 to determine whether a repeated field exists in an inputted frame. If a repeated field exists, the eliminate repeated field component 364 may eliminate the repeated field using any of several known methods, including removing the field and inserting a reference to a previous field, and averaging the two identical fields to improve the image quality.

The controller, including motion estimation phase 2 366, finalizes this encoding process. Phase 2 of the motion estimation process 366 determines the remaining motion vectors, using a reconstructed frame 368 as a reference, which refers to a reconstructed frame occurring before the frame which is being encoded. In one embodiment, the phase 1 uses frames from the original video sequence to determine motion vectors. Using original frames to compute motion vectors can lead to more accurate motion vectors because the original frames are not deteriorated. Phase 2 can use reconstructed frames because the decoder has no information about the original frames, so the phase 2 motion estimation would need to use reconstructed frames to avoid error drifting. The controller including motion estimation phase 2 366 outputs motion vectors 370.

This approach not only has effects of mixing reference to the original frames and the reconstructed frames, but greatly reduces the overall computational load, especially when repeated fields are detected. In addition, since phase-one motion estimation is separated from the encoding process, it can be executed in the same order as input frames. Thus, this two-phase motion estimation structure will not increase the complexity of the encoder.

FIGS. 4, 5, 6, 7, 8, and 9 illustrate timing considerations when using a motion estimator according to some embodiments. The following timing diagrams explain the operation of a motion estimator only in specific circumstances, and are meant only as examples of the operation of a motion estimator. The following diagrams may be used to explain the timing considerations of the process of FIG. 1.

Motion estimation with the mode decision to determine the best motion vector for each macroblock is one of the most computation intensive processes that an encoder must complete. As a result, a processor must take timing into account when the motion estimation process is modified, for example, when a repeated field is detected and the second phase of the motion estimation becomes unnecessary. The following timing diagrams illustrate such considerations.

In one embodiment, a video encoder normally operates the top-field-first condition. That is, when using interlaced frames, each frame having a top field and a bottom field, the top field is encoded before the bottom field. In the bottom-field-first condition, the bottom field of the frame is encoded first. As explained below, it is possible for the encoder change from the top-field-first condition to the bottom-field-first condition.

Figure 4:
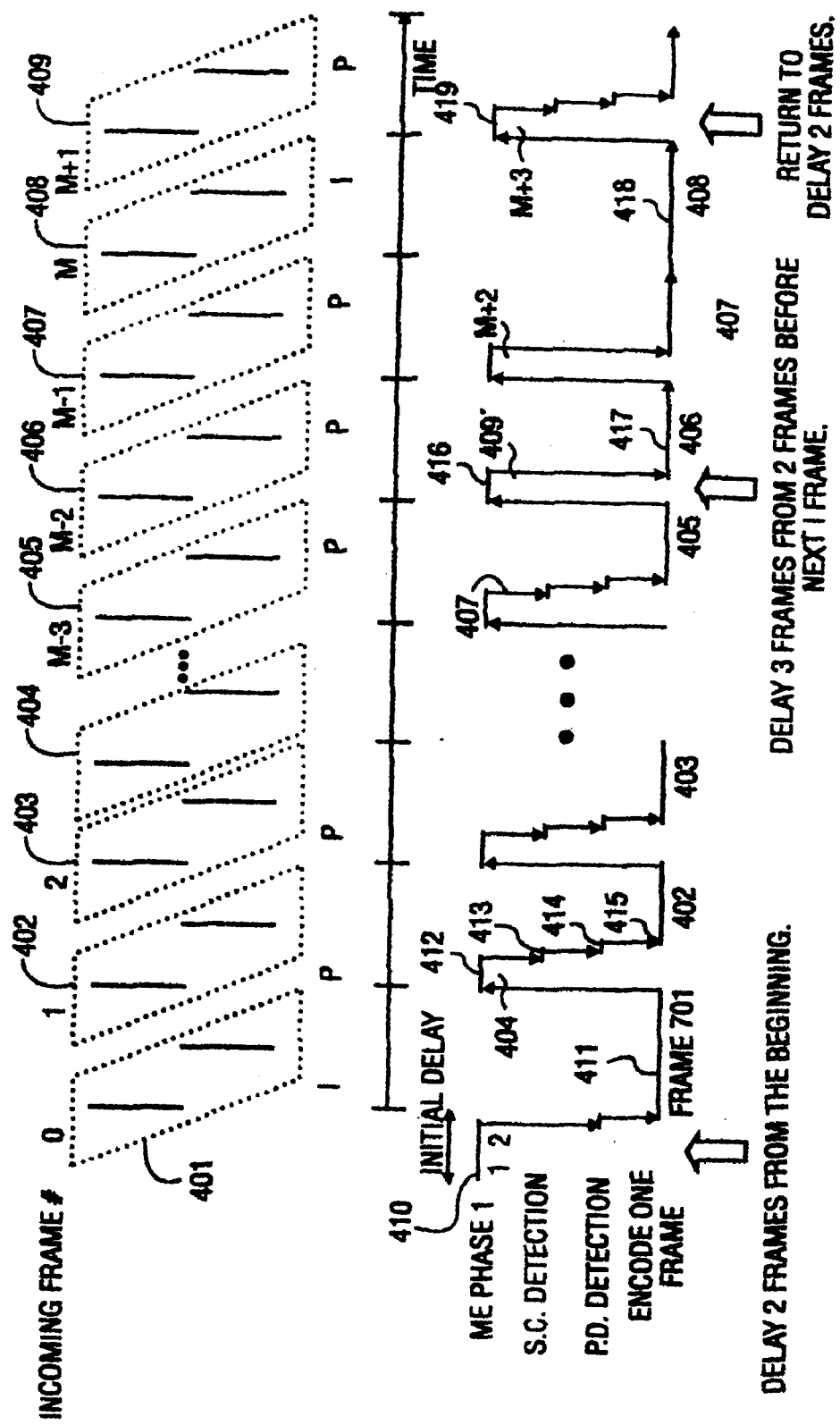
FIG. 4 is a timing diagram for a video sequence without scene change or repeated fields.

FIG. 4 is a timing diagram for a video sequence without scene change or repeated fields. Frames 401, 402, 403, 404, 405, 406, 407, 408, and 409 are to be encoded. Frames 401 through 409 are to be shown sequentially. Here, frame 408 is an I-frame. At time 410, the motion estimator initiates with two phase one motion estimations in order to apply 3:2 pull-down detection. This initiation puts the first phase two frames ahead of the second phase. For example, frame 404 is processed in the first phase of the motion estimator during the same cycle that frame 402 is processed in the second phase. Encoding of a frame is completed when the second phase and final encoding operations are completed, so after second phase motion estimation for frame 401 is completed at time 411, frame 401 has been fully encoded. Then, the motion estimator regularly performs the following steps in a cycle: phase one motion estimation for frame 404 (at time 412), scene change detection (at time 413), 3:2 pull-down detection (at time 414), and phase two motion estimation and final encoding for frame 402 (at time 415).

Two frames before the next I-frame 408 is fully encoded at time 418, at time 416 phase one for frame 409 is completed. During this cycle, phase two for frame 406 is completed, so it would be expected that phase one for frame 408 would be executed because of the two frame delay. However, frame 408 is an I-frame, and as such has no motion vectors, and therefore does not require phase one motion estimation. So, the frame after the I-frame, frame 409, is encoded at time 416. Additionally, since there are no motion vectors for frame 408, scene change and 3:2 pull-down detections are not performed. At time 418, an extra frame is encoded, so at time 419, the two frame delay and the cycle return to normal.

Figure 5:
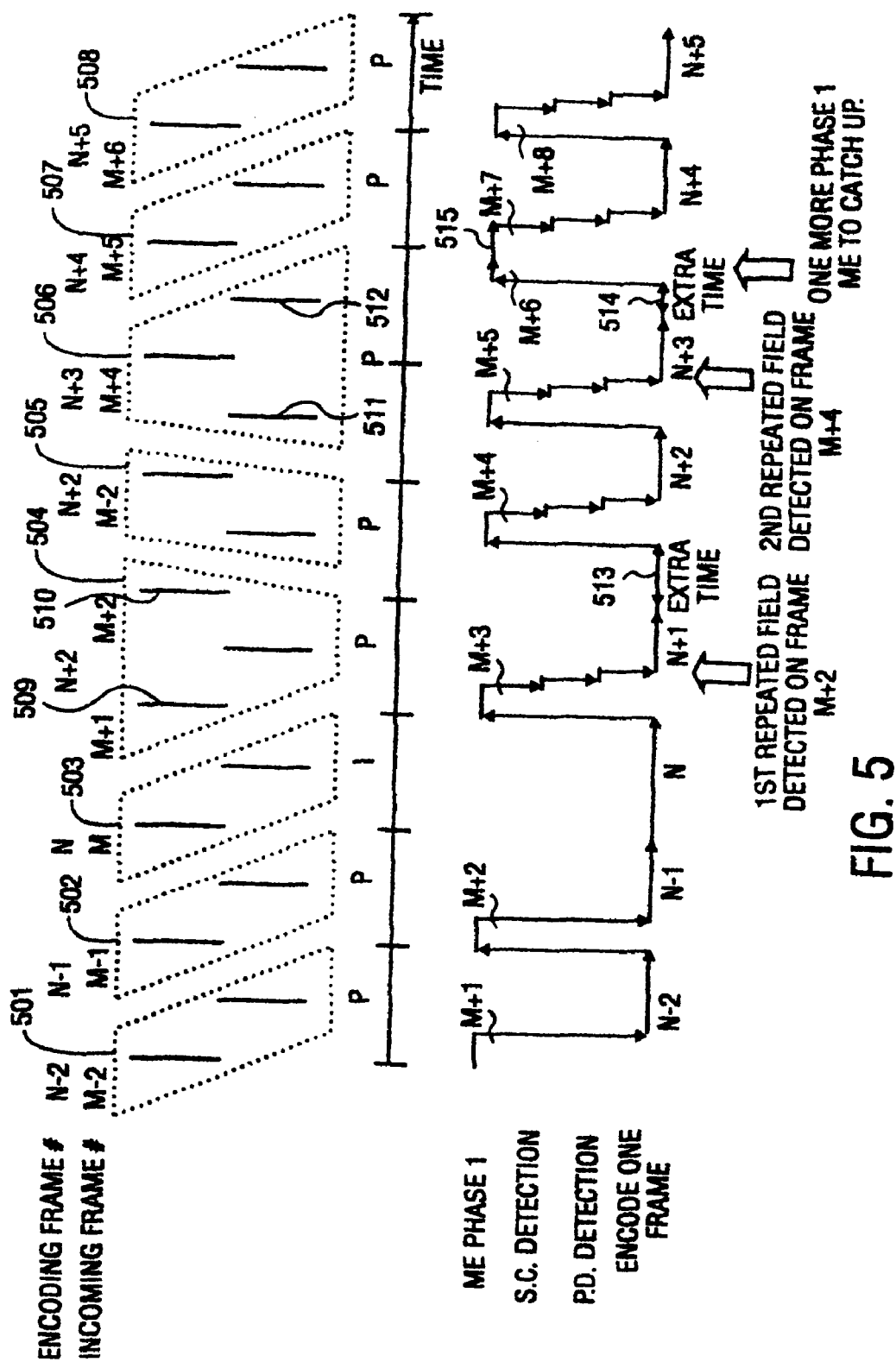
FIG. 5 is a timing diagram for a video sequence with repeated fields.

FIG. 5 is a timing diagram for a video sequence with repeated fields. Frames 501, 502, 503, 504, 505, 506, 507, and 508 are to be encoded in sequence. Here, repeated fields can be encoded into the same frame as the field they are repeated from. So, frame 504 has three fields, field 510 is a repeat of field 509. Similarly, frame 506 has three fields, field 512 is a repeat of field 511. When encoding three fields into one frame, there will be a time gain. For example, at time 513, when encoding frame 504, there is extra time because the field 510 does not need to be encoded again. This extra time can be used to improve picture quality by taking an average of the two essentially identical fields 509 and 510 for noise reduction or by doing motion estimation refinement. There is also extra time at time 514, when encoding frame 506. As shown here, the extra time gained because of the repeated field is less for frame 506 than for 504. It is understood that the amount of time gained is variable, and will differ.

In one embodiment, after two repeated fields are removed, at time 515, the first phase of the motion estimator needs to be executed twice to keep up with the advance set of motion vectors.

Figure 6:
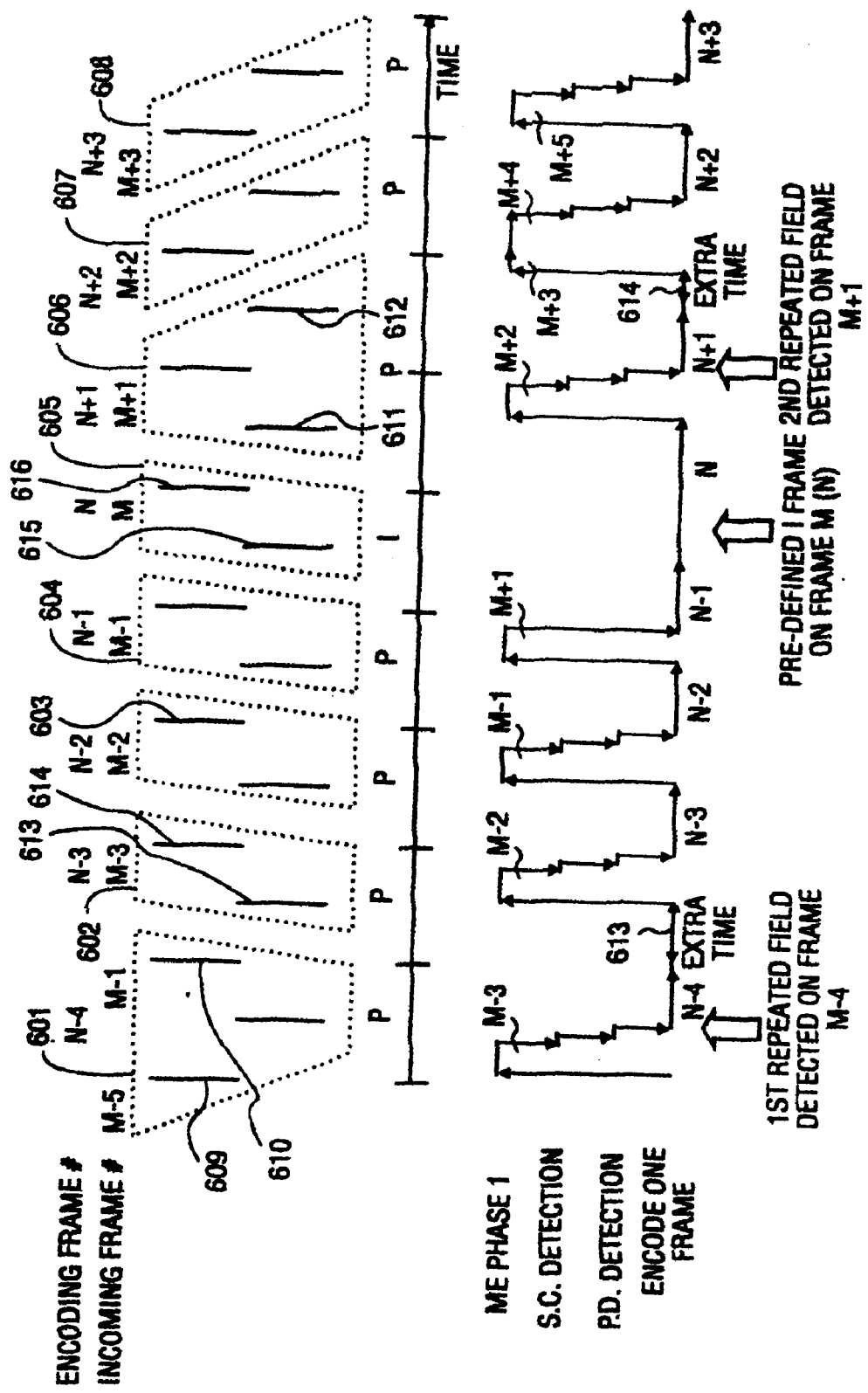
FIG. 6 is a timing diagram for a video sequence with an I-frame in between two repeated fields.

FIG. 6 is a timing diagram for a video sequence with an I-frame in between two repeated fields. Frames 601, 602, 603, 604, 605, 606, 607, and 608 are to be encoded in sequence. Here, frames 601 and 606 have repeated fields, and frame 605 is an I-frame. Field 610 is a repeat of field 609, and is a top field, whereas field 612 is a repeat of field 611, and is a bottom field. In one embodiment, the encoder would be operating in a top-field-first condition. However, when there is a repeated field as with frame 601, the bottom field 613 of frame 602 will be encoded first, and the top field 614 second, and the encoder will be running in a bottom-field-first condition. Normally, another frame with a repeated field would intervene and return the process to encoding the top field first. I-frame 605 occurs before top-field-first encoding can be resumed. So, to remedy this problem, the encoder can simply encode the bottom field 615 of I-frame 605 first.

Figure 7:
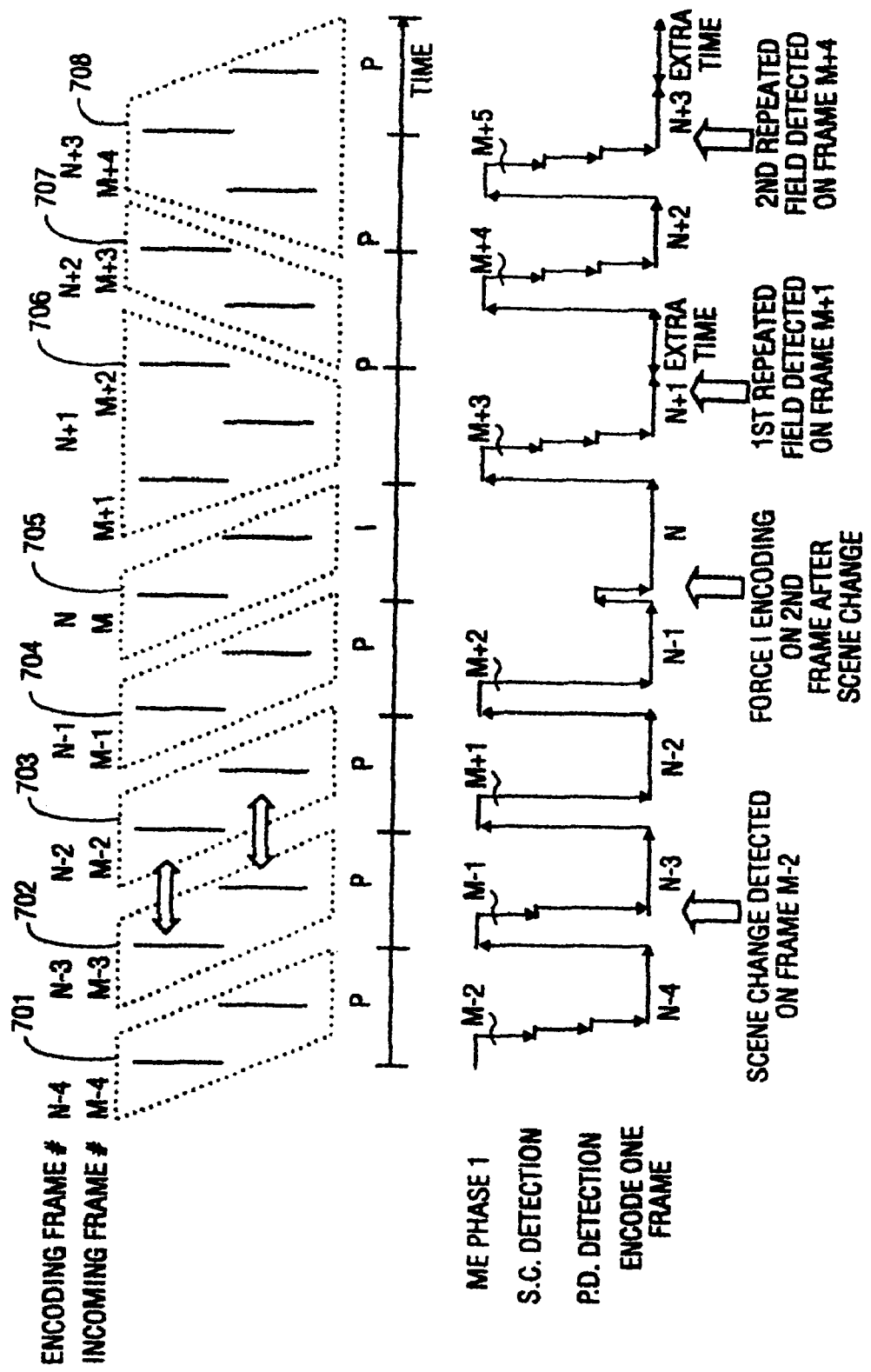
FIG. 7 is a timing diagram for a video sequence with a scene change during a top-field-first situation.
Figure 14:
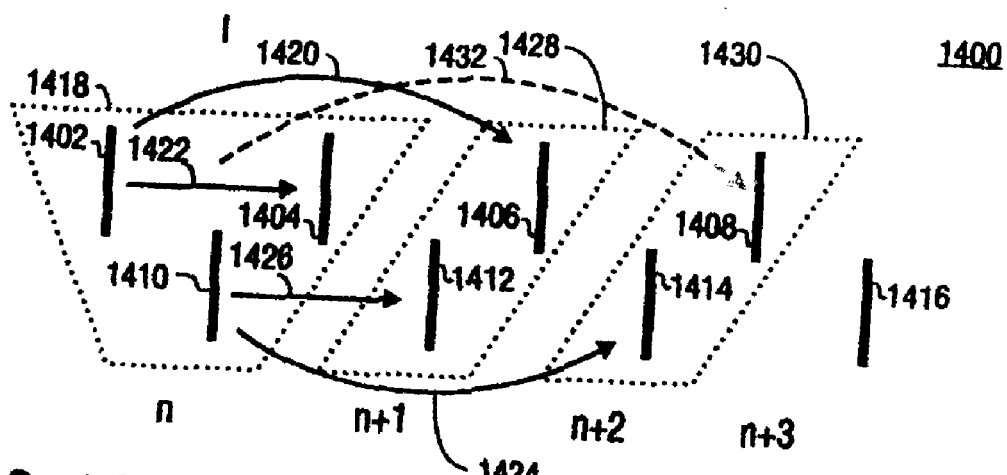
FIG. 14 illustrates a video sequence having a repeated field in an I-frame.

FIG. 7 is a timing diagram for a video sequence with a scene change during a top-field-first situation. Frames 701, 702, 703, 704, 705, 706, 707, and 708 are to be encoded in sequence. FIG. 14 further illustrates the sequence running in a top-field-first situation. There is a scene change detected between frames 702 and 703. Ideally, then, frame 703 would be encoded as an I-frame. There are concerns about the speed of variable length encoding (VLE), and because there is low visual sensitivity before and after the scene change, the I-frame can be postponed until frame 705. Also, frames 702 and 703 can be encoded as P-frames without adverse effect.

Figure 8:
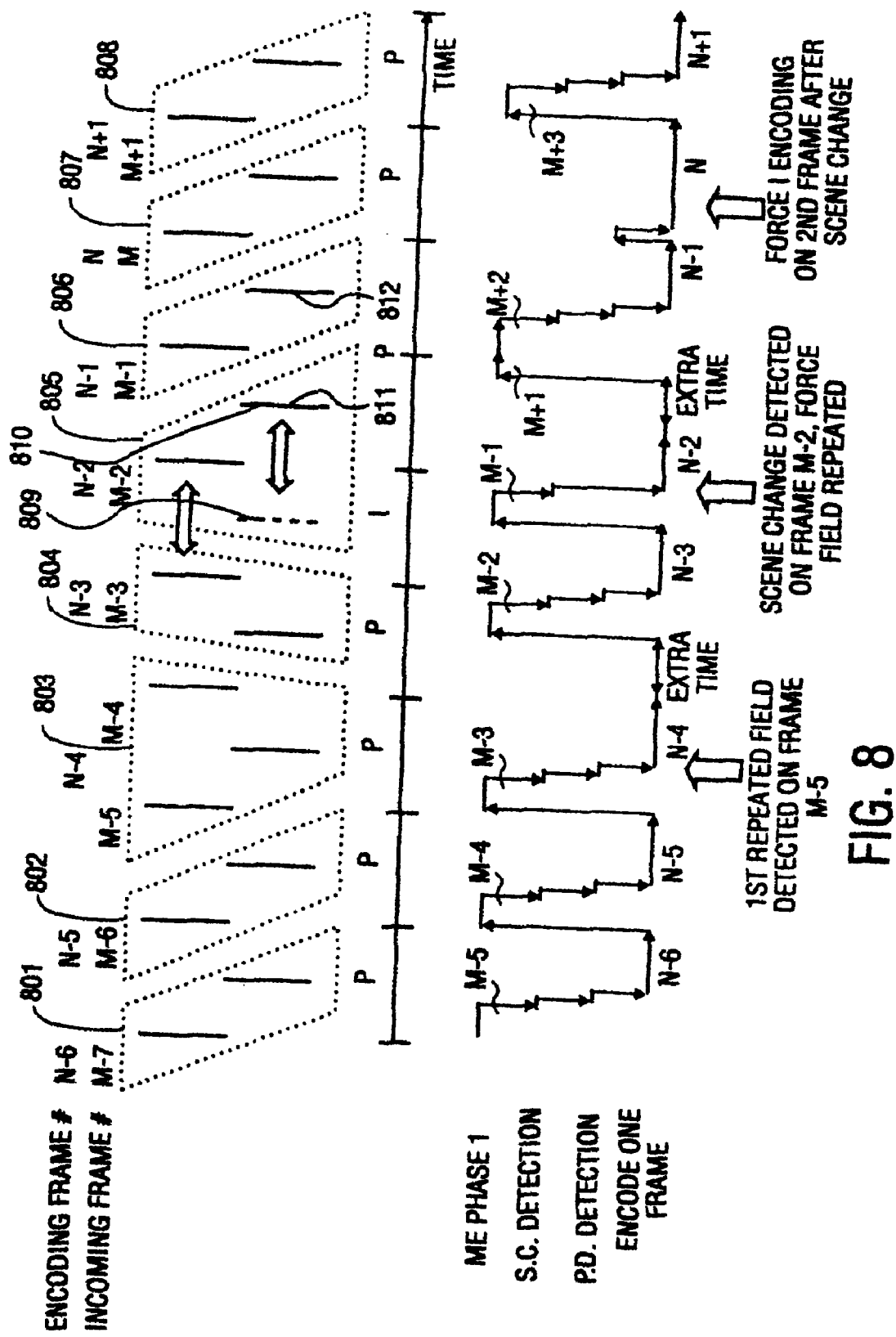
FIG. 8 is a timing diagram for a video sequence with a scene change during a bottom-field-first situation.

FIG. 8 is a timing diagram for a video sequence with a scene change during a bottom-field-first situation. Frames 801, 802, 803, 804, 805, 806, 807, and 808 are to be encoded in sequence. Frame 803 has a repeated field, and this causes the sequence to begin encoding bottom-field-first starting with frame 804. Further, there is a scene change detected between frames 804 and 805. This may cause an extra field 809, the bottom field of frame 804, to occur which cannot be encoded with frame 804, since frame 804 has already been encoded, and which cannot be encoded with frame 805, since frame 805 is a different scene. This can be remedied by replacing field 809 with the bottom field 810 of frame 805, and encoding frame 805 as a frame with a repeated field. The remaining fields can then be encoded as top-field-first.

Figure 9:
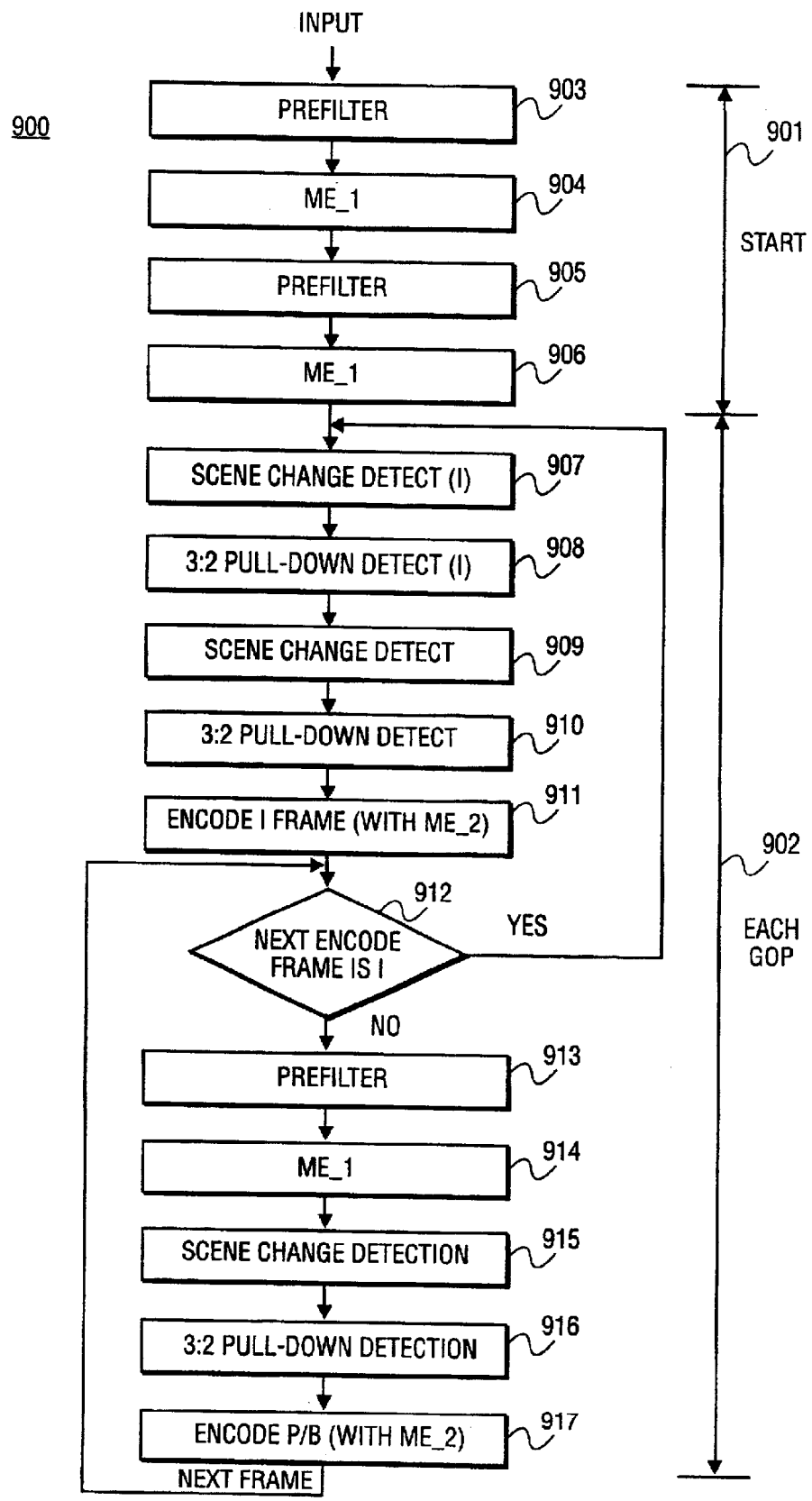
FIG. 9 is a flow diagram illustrating the operation of an encoder according to one embodiment.

FIG. 9 illustrates another embodiment of an encoder. In this embodiment, the encoder is capable of encoding all three types of MPEG frames—I-frames, P-frames, and B-frames. However, it is understood that the following flow diagram represents the operation of only one specific embodiment, and that other embodiments may exist. This embodiment of an encoder uses many of the same steps and processes as the encoder described in FIG. 1. It uses a two-phase motion estimation, scene change detection, and 3:2 pull-down detection. The process 900 encodes an entire GOP. The encoder operates in two stages—a start stage 901 and a process stage 902.

The start stage 901 includes initializing the encoder so that it can begin normal operation on the GOP. The encoder receives an input of video, and processes two frames in the first phase of motion estimation to provide the forward field motion vectors to complete the scene change detection and 3:2 pull-down detection operations later in encoding. First, the first frame of video is prefiltered in block 903. Then, the first phase of motion estimation is completed for the first frame in block 904. The first phase of motion estimation provides the field motion vectors—the motion vectors that relate the two fields of the same polarity, as explained above. In block 905, the second frame of video is prefiltered, and in block 906, first phase motion estimation is performed on the second video frame.

Process stage 902 does the encoding for each GOP. After determining two sets of field motion vectors, the process stage begins in block 907, where scene change detection is performed to determine if there is a scene change between the I-frame and the following frame. In block 908, 3:2 pull-down detection is to check whether there is a field repetition after this I-frame. In blocks 909 and 910, scene change detection and 3:2 pull-down detection is performed for the frame following the I-frame. In block 911, the I-frame is encoded. In block 912, if the next to be coded frame is an I-frame, the process returns to block 907. The procedures in blocks 907–911 are performed when a new GOP is going to be encoded.

In one embodiment, if a scene change is found either in the frame after a predetermined I-frame, or two frames after this I-frame, then this I-frame may be encoded as a P-frame in order to save resources, since the full encoding of the I-frame will not be referenced if a new GOP will be started soon afterward. Further, if the frame immediately following the I-frame has a repeated field, as would be detected by the 3:2 pull-down detection, a repeated field flag can be set while encoding the I-frame in block 911. According to one embodiment, a repeated field flag in an MPEG encoded video bitstream indicates to a decoder that a repeated field exists and the decoder needs to compensate for that repeated field.

In block 912, if the next frame is a B or P frame, encoding continues with block 913. In block 913, the next frame is prefiltered. To have two sets of motion vectors in advance for the detections, the field motion vectors are determined in block 914 when the first phase of motion estimation is executed. In block 915, scene change detection is executed for the frame. If a scene change is detected, the encoder can start a new GOP in the next frame to reflect the fact that the video has a new scene. More detailed case studies of scene change detection can be found below. In block 916, 3:2 pull-down detection is performed to detect repeated fields for the next frame. If a repeated field is detected, the repeated field can be encoded with the previous frame. An encoder can eliminate a repeated field using a number of methods, including removing the field and inserting a reference to the field from which it was repeated, or averaging the two repeated fields to obtain higher quality video. In block 917, the P- or B-frame is encoded by completing the encoding of the motion vectors using the second phase of motion estimation. Once the encoding of frames is completed in block 917, the process may begin again at block 912, until the GOP is finished.

When a scene change is detected, the encoder must determine what to do with the current frame and the following frames. The encoder could encode the current frame as an I-frame beginning a new GOP, but if the encoder considers the human visual system, there may be a better way to respond to a scene change. Since the sensitivity of human visual system drops before and after a scene change happens, the pictures close to a new scene can be coded in lower quality to save processing resources. FIGS. 10 through 13 illustrate several examples of situations in which a scene change is detected. The specifics of scene change detection are explained below.

FIG. 10 illustrates a video sequence having a scene change after an I-frame and before a B-frame. In the video sequence 1000, the scene change occurs after I-frame 1001 at frame 1002, a B-frame. The video sequence consists of top fields 1004, 1006, 1008, 1010, 1012, 1014, and 1016, and bottom fields 1018, 1020, 1022, 1024, 1026, 1028, and 1030. Frame 1002 is comprised of fields 1010 and 1024. Further, sequence 1000 has set of motion vectors 1032 relating fields 1004 and 1008, set of motion vectors 1034 relating fields 1004 and 1006, set of motion vectors 1036 relating fields 1008 and 1012, set of motion vectors 1038 relating fields 1008 and 1010, set of motion vectors 1040 relating fields 1018 and 1022, set of motion vectors 1042 relating fields 1018 and 1020, set of motion vectors 1044 relating fields 1022 and 1026, and set of motion vectors 1046 relating fields 1022 and 1024.

When a scene change occurs immediately after an I-frame, it may be advantageous to code the I-frame as a P-frame, because an I-frame occupies considerably more space than a P-frame, and may not be very useful as a reference frame because of the scene change. The encoder may them encode frame 1001 as a P-frame, and because frame 1001 is now a P-frame, frame 1001 needs motion vectors As a result, motion estimation must be performed, resulting in sets of motion vectors 1032 and 1040. The I-frame can be delayed to a later P-frame, here frame 1050 would become an I-frame, since the motion vectors for frame 1050 have not yet been calculated, and it will save processing time to use the motion vectors which had already been calculated for P-frame 1048. In addition, encoder can allocate fewer resources for encoding frames 1002 and 1048 due to the lack of sensitivity of the human visual system near a scene change, and save the resources for the other more important frames.

FIG. 11 illustrates a video sequence having a scene change occurring two frames after an I-frame. A scene change is detected in video sequence 1100 at frame 1102. An I-frame was originally scheduled to occur at frame 1104, but for the same reasons as above, the encoder can delay the I-frame. When frame 1104 is converted from an I-frame to a P-frame, sets of motion vectors 1106 and 1108 must be determined. The I-frame may be delayed until P-frame 1110, and since no motion vectors have been determined for frame 1110, no computation will be wasted.

FIG. 12 illustrates a video sequence having a scene change happening at a B-frame. Here, unlike the situation in FIG. 10, the scene change occurs at a B-frame, but not immediately after an I-frame. In video sequence 1200, the scene change occurs at frame 1202. I-frame may be encoded at frame 1204, immediately after the scene change, since there is no recent I-frame. The next P-frame, frame 1204, can be converted to an I-frame, and since no motion vectors had been determined for frame 1204, no computation is wasted.

FIG. 13 illustrates a video sequence having a scene change occurring at a P-frame. In video sequence 1300, the scene change occurs at frame 1302. Since motion vectors have already been determined for frame 1302, the encoder may choose to delay the encoding of a new I frame to frame 1308, the next P-frame.

Figure 15:
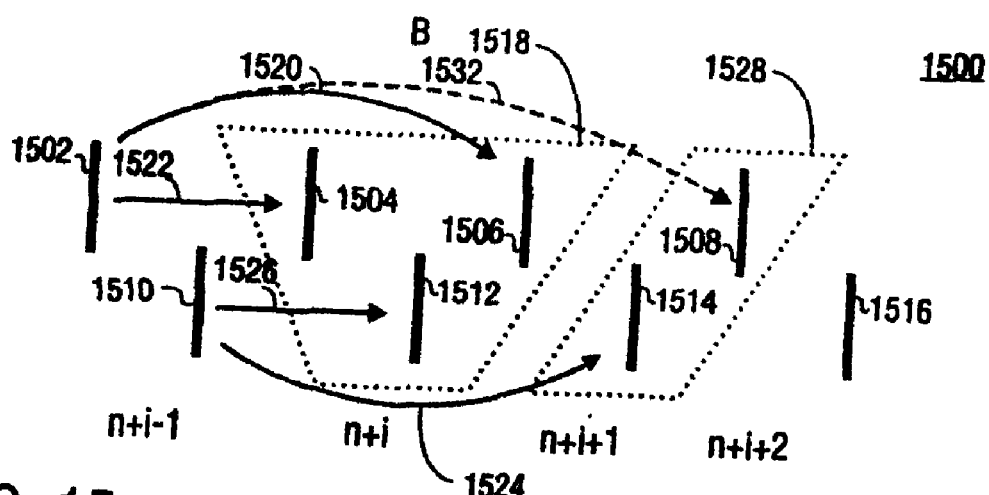
FIG. 15 illustrates a video sequence having a repeated field in a B-frame.
Figure 16:
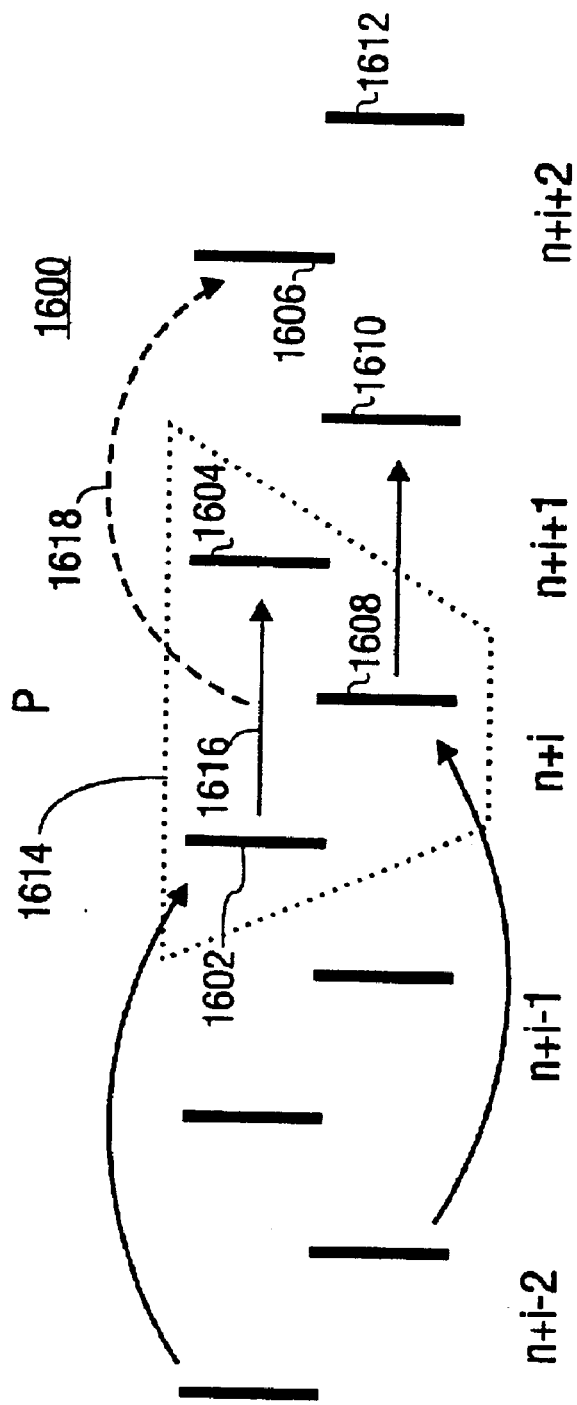
FIG. 16 illustrates a video sequence having a repeated field in a P-frame.

When a repeated scene is detected using 3:2 pull-down detection, the encoder determines what to do with the current frame and the following frames. FIGS. 14 through 16 illustrate several examples of situations in which a repeated field is detected.

FIG. 14 illustrates a video sequence having a repeated field in an I-frame. Video sequence 1400 comprises top fields 1402, 1404, 1406, and 1408, and bottom fields 1410, 1412, 1414, and 1416. I-frame 1418 comprises fields 1402, 1404, and 1410. Field 1404 is a repeated field from field 1402. Video sequence 1400 further has sets of motion vectors 1420, 1422, 1424, and 1426.

A 3:2 pull-down inverse can be performed to remove the repeated field 1404. When the repeated field 1404 is removed, and replaced with a reference to field 1402, the next frame 1428 will be encoded in a bottom-frame-first condition. Further, frame 1430 will be referencing to frame 1418 for motion estimation. Because the set of motion vectors 1422 will no longer be useful to the encoder, set of motion vectors 1432 must be established relating field 1408 and field 1402. The encoder can then continue to operate as normal, in a bottom-field-first situation until next repeat field is detected.

FIG. 15 illustrates a video sequence having a repeated field in a B-frame. Video sequence 1500 comprises top fields 1502, 1504, 1506, and 1508, and bottom fields 1510, 1512, 1514, and 1516. B-frame 1518 comprises fields 1504, 1506, and 1512. Field 1506 is a repeat of field 1504. Video sequence 1500 also has sets of motion vectors 1520, 1522, 1524, and 1526. The next frame in the sequence, frame 1528, will be encoded in the bottom-field-first situation.

Repeated field 1506 will be replaced with a reference to field 1504. Because set of motion vectors 1520, which field 1506 was using for encoding, are no longer needed, they can be removed. Field 1506 was referring to field 1502 for motion estimation, but now that field 1506 has been removed, field 1508 can refer to field 1502 using motion vector 1530. Rearranging the motion vectors in this manner allows the encoder to keep the correct timing.

FIG. 16 illustrates a video sequence having a repeated field in a P-frame. Video sequence 1600 comprises top fields 1602, 1604, and 1606, and bottom fields 1608, 1610, and 1612. P-frame 1614 is comprised of fields 1602, 1604, and 1608. Field 1604 is a repeated field of field 1602. Because field 1604 will be removed and replaced with a reference to field 1602, set of motion vectors 1616 relating field 1604 and 1602 is no longer necessary. Instead, motion vector 1618 may be substituted, relating field 1606 to field 1602.

For any of the cases in FIGS. 14, 15, and 16, a bottom-field-first situation would be processed in the same manner.

For this embodiment of an encoder, the first phase motion estimation can be executed a few frames in advance for future use in scene change detection and 3:2 pull-down detection. However, because of variable length encoding (VLE), a condition in which a certain length of video does not necessarily occupy a constant amount of data storage, I-frame encoding requires extra time. To compensate for this, in one embodiment, motion estimation for future frames is not determined during I-frame encoding. Also, since, in one embodiment, the encoder needs to encode P-frames before B-frames, and as a result, there is a three frame delay for both I- and P-frame encoding.

For example, the encoder would begin by prefiltering a frame at time 0, and prefiltering another frame at time 1. At time 2, the encoder prefilters a third frame, and does first phase motion estimation for the first frame that was prefiltered at time 0. At time 3, the encoder prefilters a fourth frame, and performs first phase motion estimation for the second frame which was prefiltered at time 1. At time 4, the encoder prefilters a fifth frame, performs first phase motion estimation for the third frame prefiltered at time 2, performs scene change and 3:2 pull-down detection for the first frame, using motion vectors from the first phase motion estimation at time 3, and finished by encoding the frame, including the second phase motion estimation. At time 5, the entire cycle is repeated, and so on, until the next I-frame comes up in the video sequence.

Figure 17A:
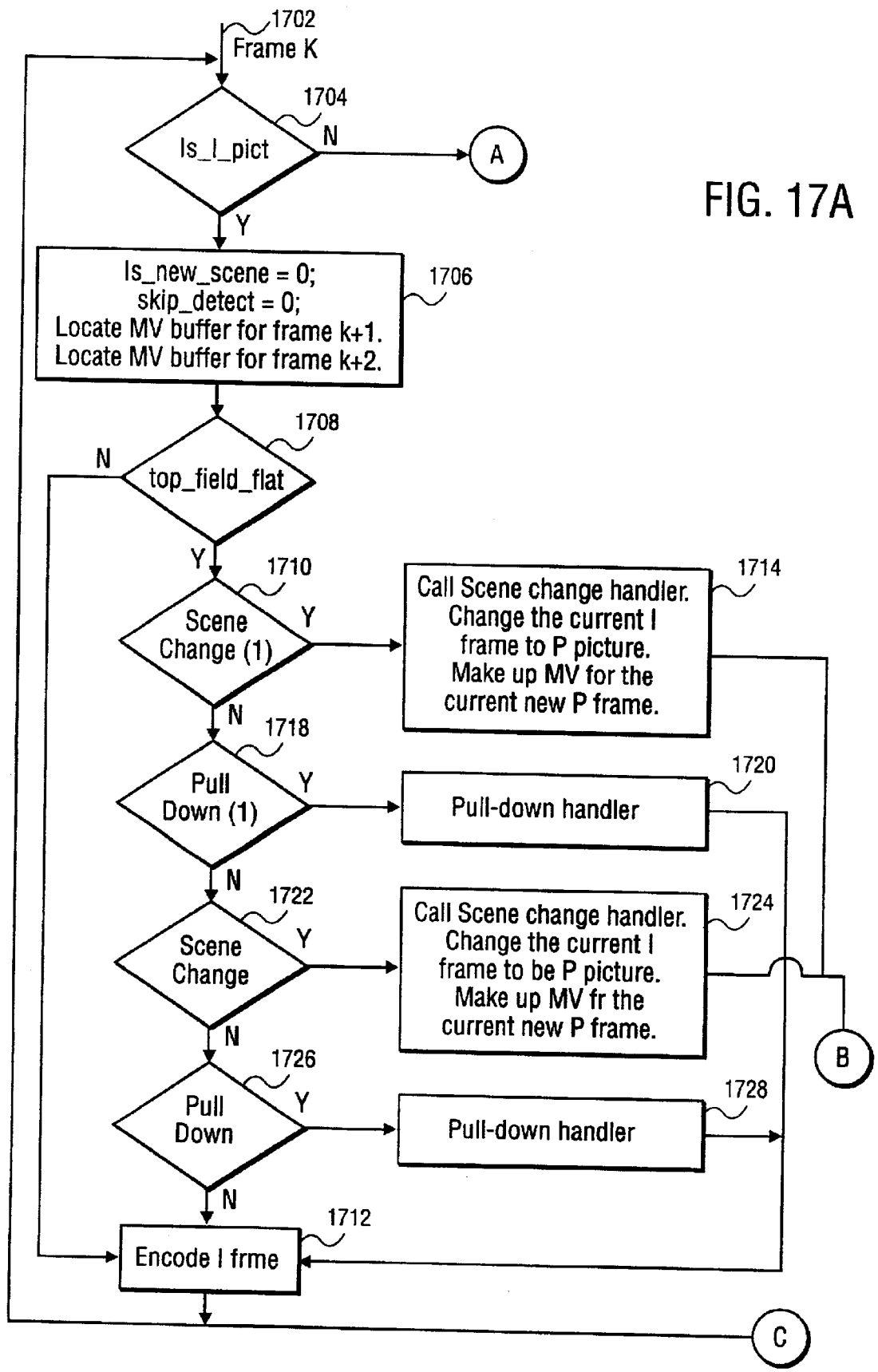
FIGS. 17a, 17b, 17c are block diagrams of an encoder according to one embodiment.
Figure 17B:
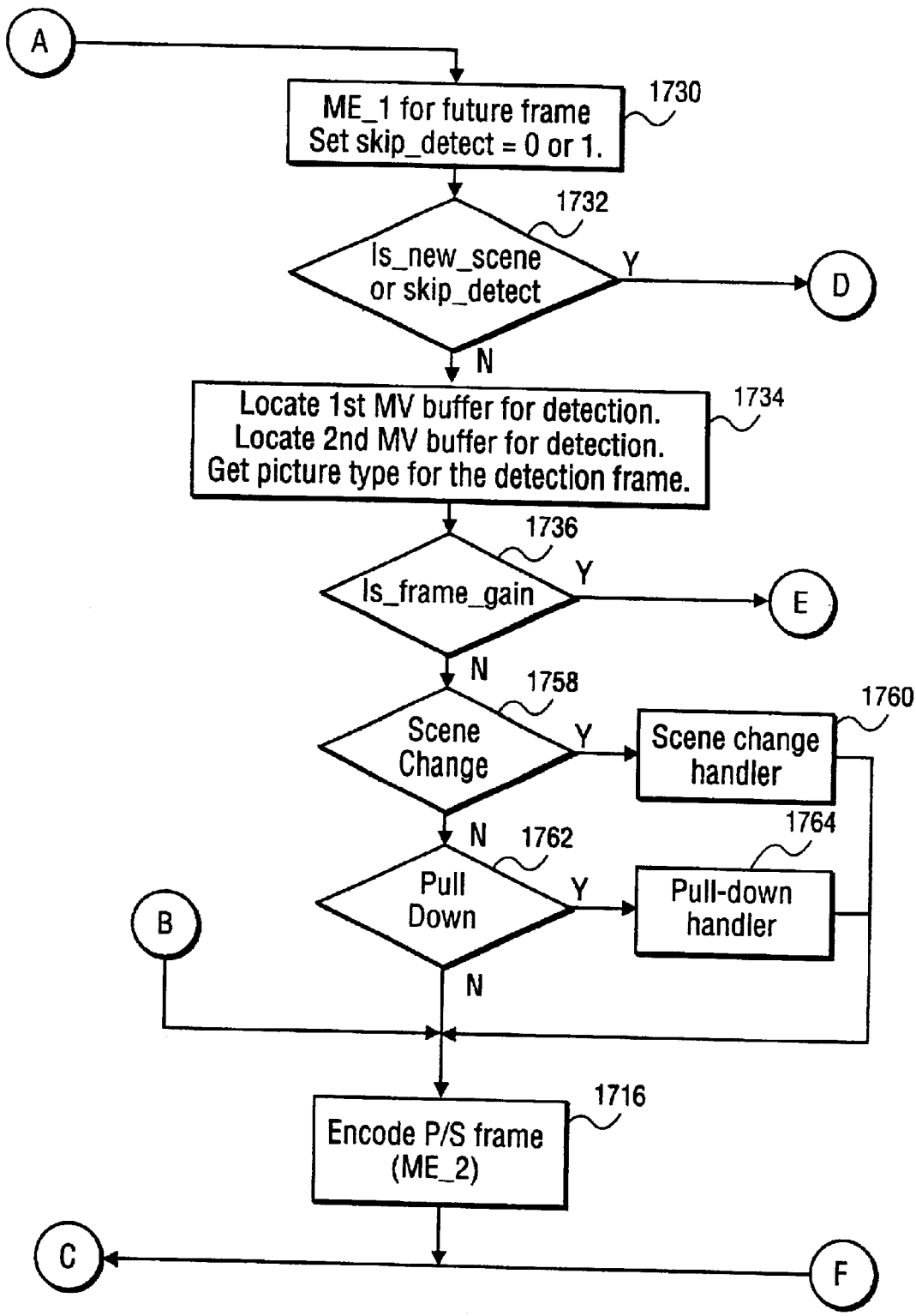
Figure 17C:
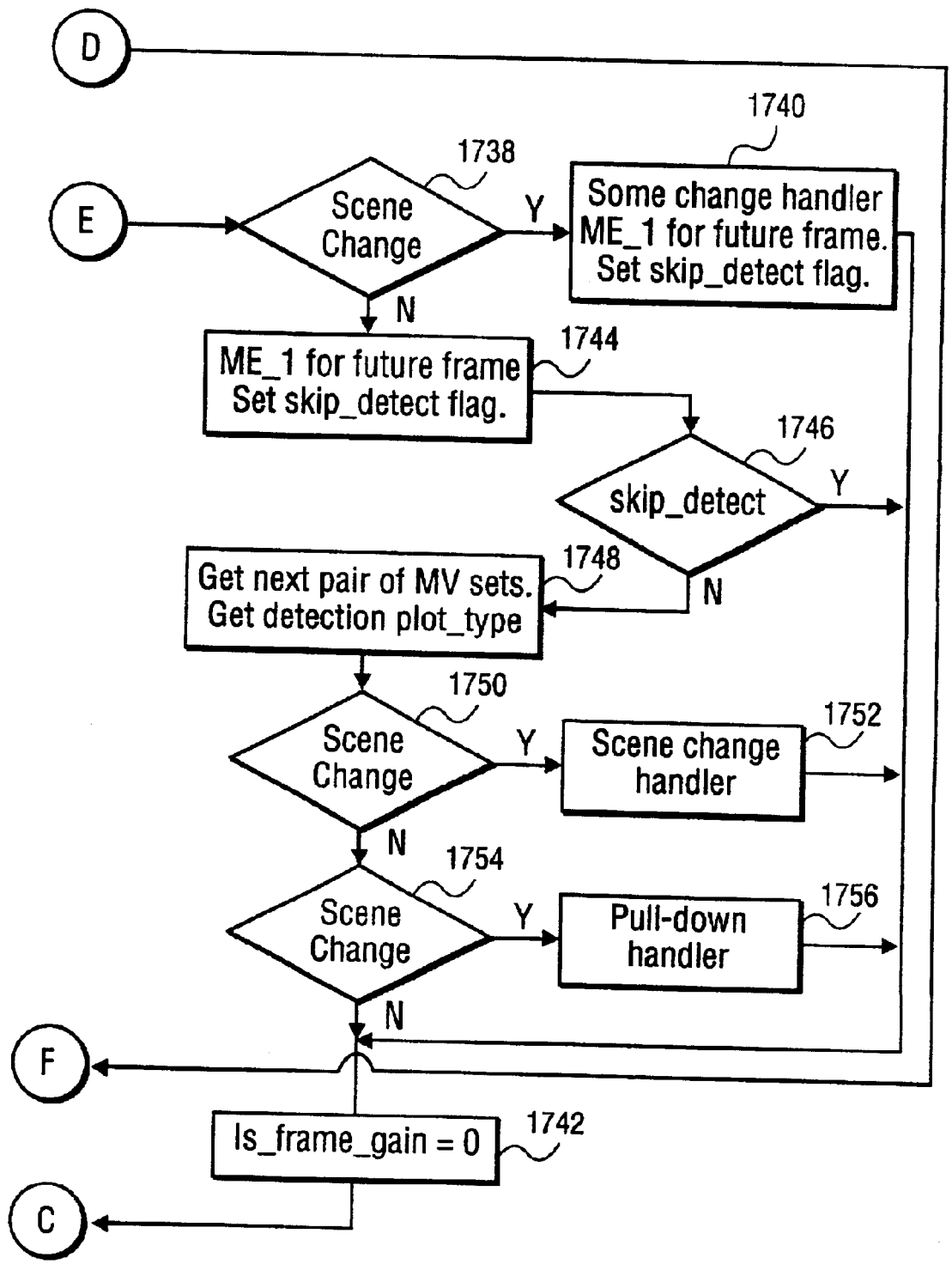

FIG. 17 is a block diagram of an encoder according to one embodiment. Video frames enter the system at point 1702. For the following description, it is assumed that the frame currently entering the encoder is frame k. At block 1704, the encoder checks whether the incoming frame k is scheduled to be encoded as an I-frame.

If frame k is an I-frame, processing moves on to block 1706, where the encoder sets variables is_new_scene and skip_detect to 0. In one embodiment, variables is_new_scene and skip_detect are flags used by an encoding scheme to instruct a decoder to properly decode a video bitstream. is_new_scene tells the encoder whether the current frame marks the beginning of a new scene, if it is equal to 0, then the current frame is not the beginning of a new scene, and if it is equal to 1, then the current frame is the beginning of a new scene. skip_detect is a variable which tells the encoder whether or not to perform the 3:2 pull-down and scene change detections, a value of 0 means that the detections should be performed, and a value of 1 means that they should be skipped. Further, in block 1706, the motion vector buffers for frames k+1 (the frame immediately following frame k) and k+2 are located. The process moves to block 1708, where if the frame is in a top-field-first situation, the process will move on to block 1710, whereas if the frame is not in a top field first situation, the process will move to block 1712, where the I-frame will be encoded, and the process will move back to point 1702.

At block 1710, scene change detection is performed for the frame k+1. If there is a scene change, the process moves on to 1714, where the current frame k, which is an I-frame will be changed to a P-frame, and new motion vectors will be determined for the frame, as was explained in FIG. 10. The process will then move on to block 1716, where the P-frame will be encoded, and the process will return to point 1702.

At block 1710, if there is no scene change, the process moves on to block 1718, where 3:2 pull-down detection is performed for the I-frame k. If a repeated field is detected, the process moves to block 1720, where the pull-down handler is executed for the necessary adjustment as was explained in FIG. 14, and moves to block 1712, where the I-frame is encoded, and finally returns to point 1702.

At block 1718, if there is no repeated field, the process moves to block 1722, where scene change is performed for the next frame. If there is a scene change, the process continues to block 1724, where the scene change handler is called for the adjustment explained in FIG. 11, and the process moves on to block 1716 for encoding, and finally back to point 1702.

At block 1722, if there is no scene change, the process continues to block 1726, where 3:2 pull-down detection is performed on the next frame. If there is a repeated field, the process continues to block 1728, where the pull-down handler is executed for the necessary adjustment explained in FIG. 15, and then proceeds to block 1712, where the I-frame is encoded, and finally returns to point 1702.

If, in block 1704, frame k is not an I-frame, the process continues to block 1730. In block 1730, the first phase of motion estimation is performed for future frames, and skip_detect is set to 0 or 1. The process continues to block 1732, where if either is_new_scene or skip_detect are equal to 1, the process continues to block 1716, and the frame is encoded before returning to point 1702.

If, at block 1732, it is determined that both is_new_scene and skip_detect are equal to 0, then the process continues to block 1734. At block 1734, the encoder locates the first and second motion vector buffers for detection, and gets the picture type for the detection frame. The process then continues to block 1736, where it is determined whether the variable is_frame_gain is equal to 1 or 0. If is_frame_gain is equal to 1, then there is a pair of repeated fields being detected and the encoder gains one frame of time. The process continues to block 1738, where a scene change detection is performed.

If a scene change is detected in block 1738, the process moves to block 1740, where the scene change handler is run, the first phase of motion estimation for future frames is performed, and the skip_detect variable is set. The process then continues to block 1742, where is_frame_gain is set to 0 to reset the indicator of frame gain, and finally the process returns to point 1702.

If at block 1738 it is determined that there is no scene change at frame k, the process continues to block 1744, where the first phase of motion estimation is performed for future frames, and the skip_detect variable is set to 0 or 1 based on whether there are enough sets of field motion vectors for detections to be performed. The process continues to block 1746, where if skip_detect is equal to 1, the process continues to block 1742, and back to point 1702. If, at block 1746, skip_detect is equal to 0, the process continues to block 1748. At block 1748, the next pair of sets of motion vectors and the picture coding type for the next frame are retrieved, and the process continues to block 1750.

At block 1750, a scene change detection is performed using the motion vector sets from block 1748. If a scene change is detected, the process continues to block 1752, where the scene change handler is called for the adjustment explained in FIGS. 12 and 13, and then the process continues to block 1742, and finally back to point 1702. If there is no scene change at block 1750, the process continues to block 1754, where 3:2 pull-down detection is executed. If there is a repeated field, the process continues to block 1756, where the pull-down handler is called for the necessary adjustment as explained in FIGS. 15 and 16, and then to block 1742, and finally back to point 1702. If there is no repeated field at block 1754, the process continues to block 1742, and finally to point 1702.

At block 1736, if the is_frame_gain variable is equal to 0, the process continues to block 1758, where a scene change detection is performed. If there is a scene change, the process continues to block 1760 where the scene change handler is called for the adjustment explained in FIGS. 12 and 13, and to block 1716, where the frame is encoded, and finally returns to point 1702. If there is no scene change detected in block 1758, the process continues to block 1762. At block 1762, the 3:2 pull-down detection is executed to determine if there is a repeated field. If there is a repeated field, the process continues to block 1764 where the pull-down handler is executed for the necessary adjustment explained in FIGS. 15 and 16, and on to block 1716 for frame encoding, and finally back to point 1702. If there is no repeated field at block 1762, the process continues to block 1716 for frame encoding, and back to point 1702.

As discussed above the encoders described selectively detect repeated fields using 3:2 pull-down detection. FIGS. 18a through 21 explain methods for detecting repeated fields using 3:2 pull-down detection according to one embodiment.

Figure 18A:
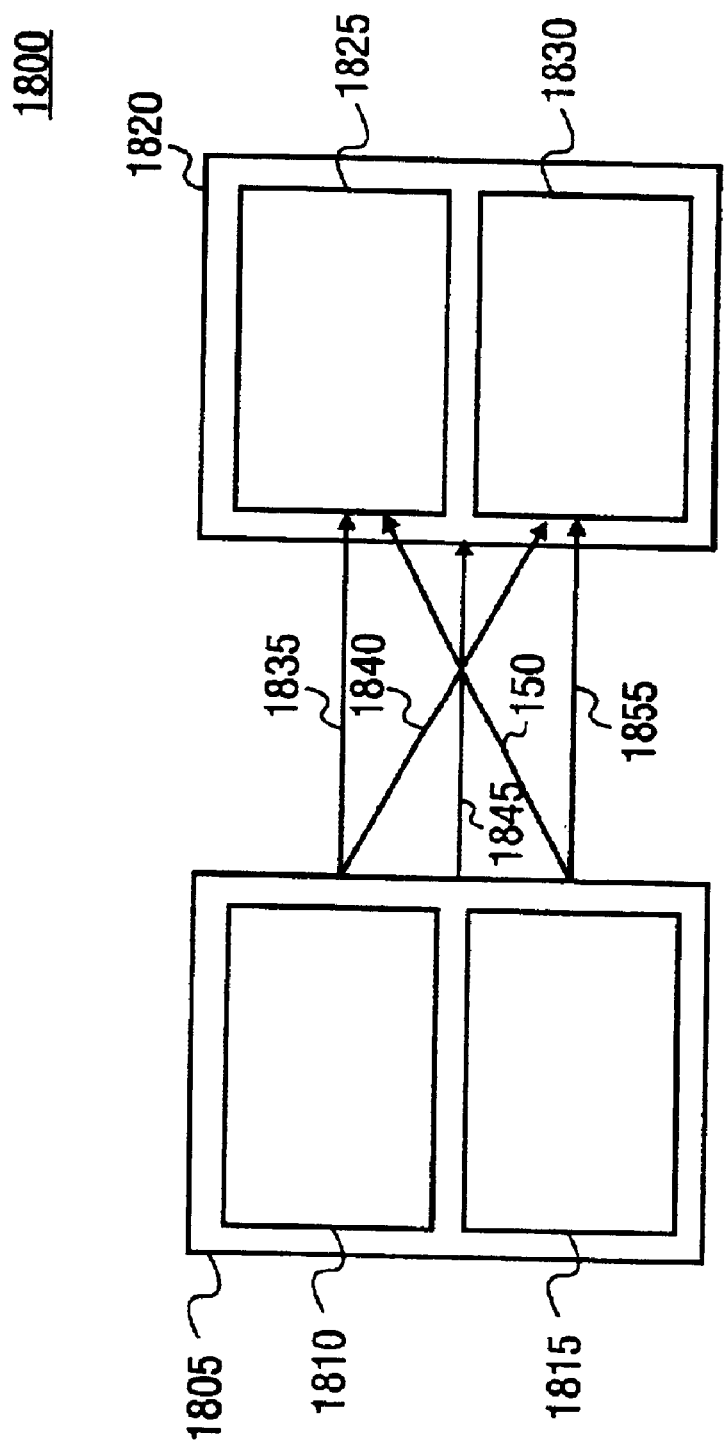
FIG. 18a illustrates two video frames and their associated motion vectors according to one embodiment.

FIG. 18a illustrates two video frames and sets of motion vectors relating the two video frames. Video frame 1805 comprises two fields, top field 1810 and bottom field 1815. Similarly, video frame 1820 similarly comprises two fields, top field 1825 and bottom field and 1830. In this embodiment, video frames 1805 and 1820 are interlaced video frames, meaning that two fields make up each frame. However, it is understood that any configuration of video frames may be used.

Set of motion vectors 1835, 1840, 1845, 1850 and 1855 relate video frames 1805 and 1820. As explained above, a motion vector relates the motion of one block or region of a field to another field. Therefore, there are typically several motion vectors that relate two fields. Here, the arrows representing sets of motion vectors 1835, 1840, 1845, 1850, and 1855 may actually represent several motion vectors.

Set of motion vectors 1835 describes the relationship between top field 1810 and top field 1825. Set of motion vectors 1840 describes the relationship between top field 1810 and bottom field 1830. Set of motion vectors 1845 describes the relationship between first video frame 1805, and second video frame 1820. Set of motion vectors 1850 describes the relationship between bottom field 1815 and top field 1825. Set of motion vectors 1855 describes the relationship between bottom field 1815 and bottom field 1830.

Since top field 1810 and top field 1825 are both the top fields in a frame, they are said to be of the same polarity. Likewise, bottom field 1815 and bottom field 1830 are of the same polarity, since they are both bottom fields. Further, the sets of motion vectors 1835 and 1855 are known as field motion vectors, since they relate two fields of the same polarity.

When encoding, it is possible to use motion vectors to determine whether a repeated field exists. For example, if field 1825 were a repeat of field 1810, then theoretically, all members of the set of motion vectors 1835 would have a magnitude of zero, since there would be no changes to track between the two fields. However, there is always some noise in any video system and some or all of the members of set motion vector 1835 may have some non-zero magnitude. However, if field 1825 is a repeat of field 1810, the sum of the magnitudes of the members of the set of motion vectors 1835 could be much less than will be the sum of the magnitudes of the members of the set of motion vectors 1855 relating fields 1830 and 1815, which are not repeated.

The following describes a process to detect repeated fields in a general manner, with more specific examples following. To find repeated fields, set of motion vectors 1855 and 1835 can be compared. A ratio of the sum of the magnitudes the members of set of motion vectors 1835 and the sum of the magnitudes the members of set of motion vectors 1855 can be compared to a threshold value. The threshold value accounts for noise, and can be a heuristically determined value. The detail will be explained later. If field 1825 is found to be a repeated field of field 1810, then it is only necessary to encode field 1825 by referring to the earlier field 1810. Additionally, one frame could be encoded with three fields, including the repeated field, and could further include references to account for the proper timing. Thusly, the encoder may save the bits that would be used to describe the motion vectors and the residual errors and the processing that would be necessary to reconstruct field 1825 and instead include only a reference to the earlier field 1810. Further, little additional processing has to be done using this method, since these motion vectors have to be calculated as part of the encoding process anyway.

To determine a repeated field, an encoder using motion vectors to execute 3:2 pull-down detection does not need to know the noise level in the system. Current methods of detecting repeated fields need to determine a noise level to detect whether there is a repeated field. Because motion vectors alone are enough to determine whether a repeated field exists, the additional computations of determining noise levels can be avoided.

As a result, if the field is repeated, it can be removed from the encoding process and the sets of motion vectors 1840, 1845 and 1850 need not be calculated. Consequently, a large amount of processing time and storage space may be saved.

Figure 18B:
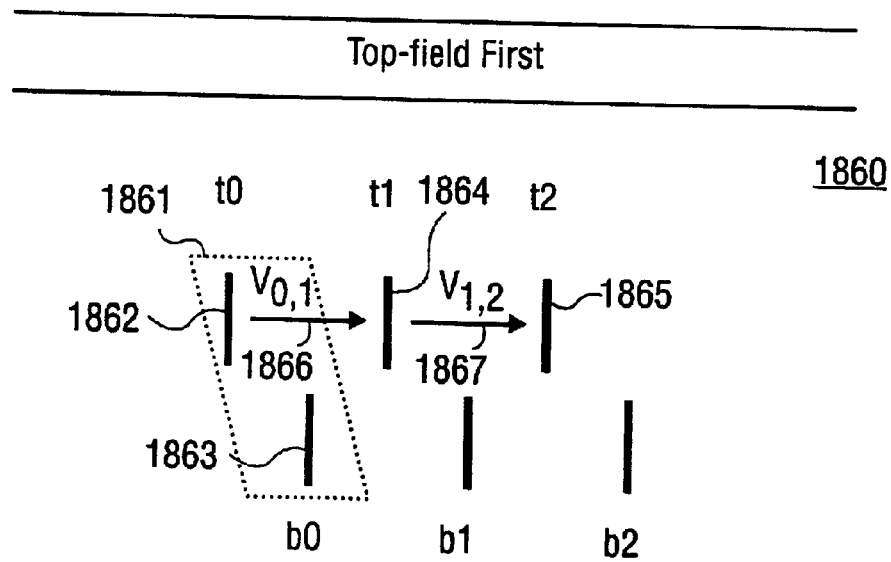
FIG. 18b illustrates a sequence of frames operating in a top-field-first condition.

FIG. 18b illustrates a sequence of frames operating in a top-field-first condition. In a top-field-first condition, the top field of a frame is display before the bottom field. Sequence of frames 1860 has frame 1861 having a top field 1862 and a bottom field 1863. Since the encoder is operating in a top-field-first condition, the top field 1862 will come before the bottom field 1863. Top fields 1864 and 1865 follow frame 1861. Set of motion vectors 1866 is a set of motion vectors between fields 1862 and 1864, which may also be referred to as $V_{0,1}$. Similarly, set of motion vectors 1867, which is between fields 1864 and 1865, may be referred to as $V_{1,2}$.

Figure 18C:
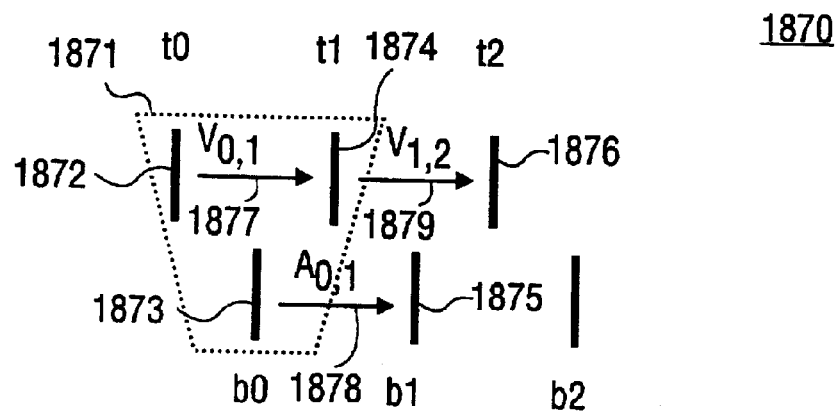
FIG. 18c illustrates a sequence of frames with a repeated field in a top-field-first condition.

FIG. 18c illustrates a sequence of frames with a repeated field in a top-field-first condition. Sequence of frames 1870 has frame 1871 having a top field 1872, bottom field 1873, and repeated top field 1874. Following frame 1871 are bottom field 1875 and top field 1876. Set of motion vectors 1877 relates top field 1872 and repeated field 1874, and may also be referred to as $V_{0,1}$. Similarly, set of motion vectors 1878 relates bottom field 1873 and bottom field 1875, and may be referred to as $\Lambda_{0,1}$, the $\Lambda$ indicating that it is a set of motion vectors relating a pair of fields of the opposite polarity as the set of motion vectors represented by V Also, set of motion vectors 1879 relates top field 1874 and top field 1876, and may also be referred to as $V_{1,2}$.

Figure 18D:
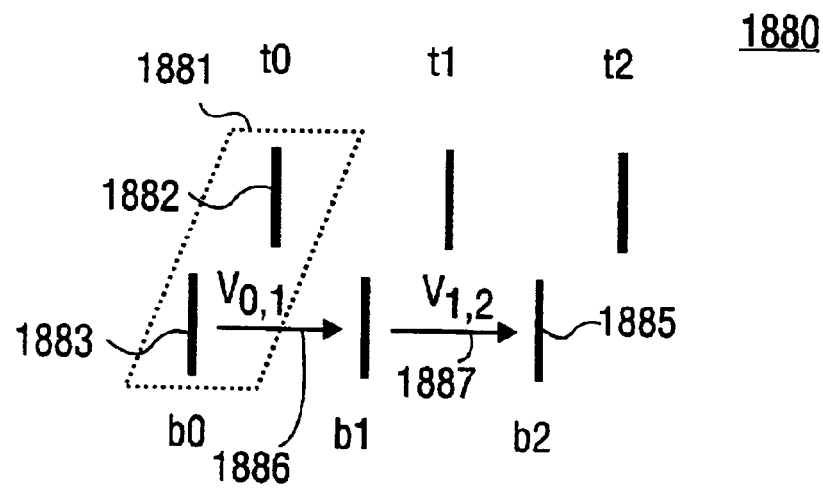
FIG. 18d illustrates a sequence of frames operating in a bottom-field-first condition.

FIG. 18d illustrates a sequence of frames operating in a bottom-field-first condition. In a bottom-field-first condition, the bottom field of a frame is display before the top field. Sequence of frames 1880 has frame 1881 having a top field 1882 and a bottom field 1883. Since the encoder is operating in a bottom-field-first condition, the bottom field 1883 will come before the top field 1882. Bottom fields 1884 and 1885 follow frame 1881. Set of motion vectors 1886 is a set of motion vectors between fields 1882 and 1884, which may also be referred to as $V_{0,1}$. Similarly, set of motion vectors 1887, which is between fields 1884 and 1885, may be referred to as $V_{1,2}$.

Figure 18E:
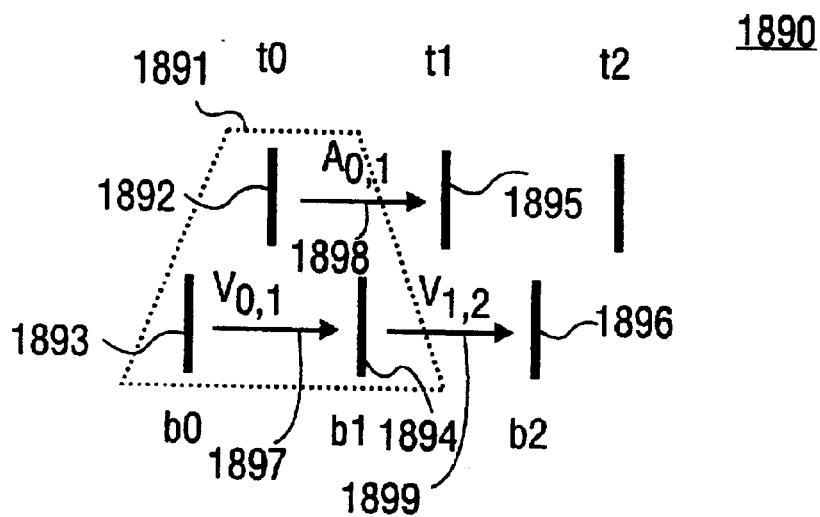
FIG. 18e illustrates a sequence of frames with a repeated field in a bottom-field-first condition.

FIG. 18e illustrates a sequence of frames with a repeated field in a bottom-field-first condition. Sequence of frames 1890 has frame 1891 having a top field 1892, bottom field 1893, and repeated bottom field 1894. Following frame 1891 are top field 1895 and bottom field 1896. Set of motion vectors 1897 relates bottom field 1893 and repeated field 1894, and may also be referred to as $V_{0,1}$. Similarly, set of motion vectors 1898 relates top field 1892 and top field 1895, and may be referred to as $\Lambda_{0,1}$, the $\Lambda$ indicating that it is a set of motion vectors relating a pair of fields of the opposite polarity as the set of motion vectors represented by V. Also, set of motion vectors 1899 relates bottom field 1894 and bottom field 1896, and may also be referred to as $V_{1,2}$.

The detection of repeated fields can be represented by the following equations. In this first equation, repeated fields can be detected in a video sequence containing I and P frames:

If $\dfrac{\sum |V_{0,1}|_c + \varepsilon}{\sum |V_{1,2}|_c + \varepsilon} < \tau$ and $\dfrac{\sum |\Lambda_{0,1}|_c + \varepsilon}{\sum |V_{0,1}|_c + \varepsilon} > \dfrac{1}{\tau}$, Then field t+1 is a repeated field from field t for top-field first cases, or field b+1 is a repeated field from field b for bottom field cases. Here, t and b can be the top and bottom fields of a frame at time 0. $|\ |_c$ means that the absolute values for all components of the vectors are used. $\varepsilon$ is a small positive number to avoid false detection and division by zero. $V_{i,j}$ represents the set of motion vectors between the fields t+i and t+j or between the fields b+i and b+j. $\Lambda_{i,j}$ represents the motion vectors between the fields having the opposite polarity from the fields represented by $V_{i,j}$, or, in other words, if the fields represented by $V_{i,j}$ are the top fields, then the fields of opposite polarity are the bottom fields, and vice versa. $\tau$ is the predetermined threshold.

FIGS. 19*a*, 19*b*, 19*c*, 19*d*, 19*e*, and 19*f* illustrate a sequence of frames having repeated fields according to one embodiment. The following equations may be used to detect repeated fields where there are B frames in a video stream. In the following equations, the variables are the same as above, but also include two thresholds $\tau_1$ and $\tau_2$, where $\tau_1$ should be smaller than 1, and $\tau_2$ should be larger than 1, or about 2, and k, where k is the frame distance between the reference field and the target field, in the following illustrations, k=2. Further, when referring to a set of vectors between two fields, for example, the notation $V_{t0 \to t1}$ represents the set of motion vectors between a first top field (field t0) and a second top field (field t1), the field t1 in the frame immediately proceeding the frame having the field t0. Likewise, the notation $V_{t0 \to t2}$ refers to a set of motion vectors between a field t0, and a field t2, the field t2 coming two frames after the field t0. A field b0 would refer to the bottom field of the frame of field t0.

The following equation can be used to determine if there is a repeated field in a situation in which a video sequence is operating top-field first, and the current frame is an I frame:

If $\dfrac{\sum |V_{t0 \to t1}|_c}{\sum |V_{t0 \to t2}|_c} < \tau_1$ and $\dfrac{\sum |V_{b0 \to b1}|_c}{\sum |V_{t0 \to t1}|_c} < \tau_2$ then field t1 is repeated.

Figure 19A:
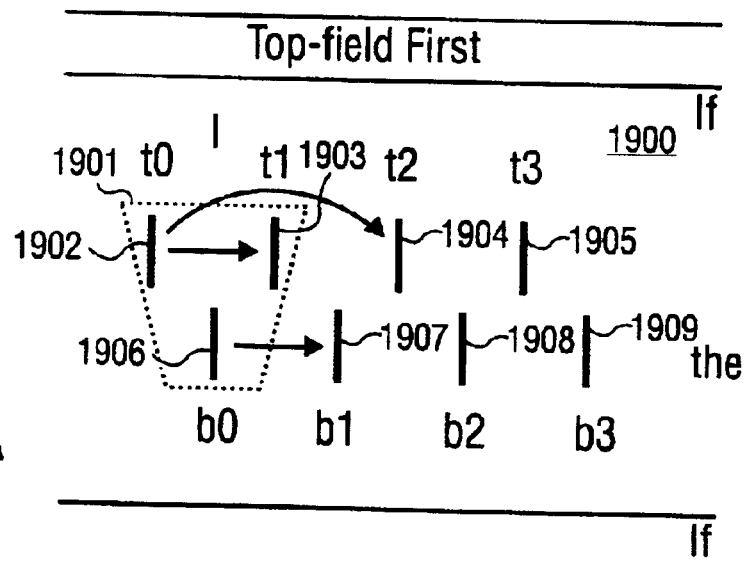
FIGS. 19a, 19b, 19c, 19d, 19e, and 19f illustrate a sequence of frames having repeated fields according to one embodiment.

Such a situation is illustrated in FIG. 19*a* Video sequence 1900 has a current frame with a repeated field 1901, top fields 1902, 1903, 1904, and 1905, and bottom fields 1906, 1907, 1908, and 1909. Fields 1902 and 1903 are repeated, and frame 1901 is made up of fields 1902, 1903 and 1906. In the equations, fields 1902, 1903, 1904, and 1905 correspond to fields t0, t1, t2, and t3, respectively. Similarly, fields 1906, 1907, 1908, and 1909 correspond to fields b0, b1, b2, and b3, respectively. Since fields 1903 and 1907 are originally scheduled as a B-frame, which can not be used as a reference frame, top field 1904 has motion vectors referring to field 1902 rather than field 1903.

If the above equation is true, then field 1903 is a repeat of field 1902, and it can be encoded as such. Further, the encoder should begin encoding bottom-field-first, starting with field 1907. Thus, the frame following frame 1901 will be comprised of fields 1904 and 1907.

The following equation can be used to determine if there is a repeated field in a situation in which a video sequence is operating top-field first, and the current frame is a B frame:

if $\dfrac{|\sum |V_{t0 \to t1}|_c - \sum |V_{t0 \to t2}|_c|}{\sum |V_{t0 \to t1}|_c} < \tau_1$, $\dfrac{|\sum |V_{b0 \to b1}|_c - \sum |V_{b0 \to b2}|_c|}{|\sum |V_{t0 \to t1}|_c - \sum |V_{t0 \to t2}|_c|} > \tau_2$, and $\dfrac{\sum |V_{t2 \to t3}|_c}{\dfrac{1}{k}\sum |V_{t0 \to t2}|_c} < \tau_1$, then field t2 is repeated.

Figure 19B:
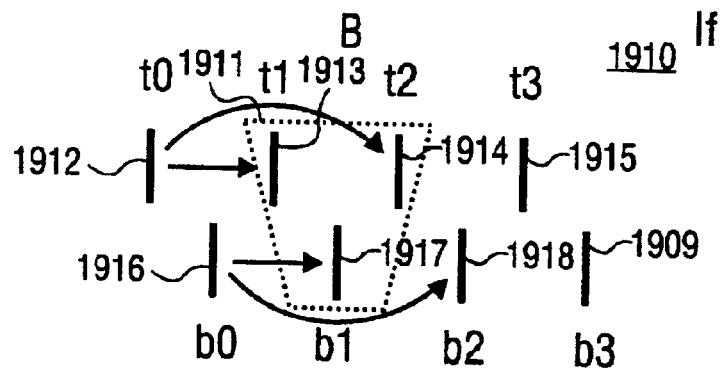

Such a situation is illustrated in FIG. 19*b*. Video sequence 1910 has a current frame 1911 with a repeated field, top fields 1912, 1913, 1914, and 1915, and bottom fields 1916, 1917, 1918, and 1919. Fields 1912, 1913, 1914, and 1915 correspond to fields t0, t1, t2, and t3, respectively. Similarly, fields 1916, 1917, 1918, and 1919 correspond to fields b0, b1, b2, and b3. Fields 1914 and 1913 are repeated, and frame 1911 is made up of fields 1913, 1914 and 1917. Since fields 1913 and 1917 are originally scheduled as a B-frame, top field 1914 has motion vectors referring to field 1912 rather than field 1913.

If the above equation is true, then field 1914 is a repeat of field 1913, and it can be encoded as such. Further, the encoder should begin encoding bottom-field-first, starting with field 1918.

The following equation can be used to determine if there is a repeated field in a situation in which a video sequence is operating top-field first, and the current frame is a P frame:

if $\dfrac{\sum |V_{t2 \to t3}|_c}{\dfrac{1}{k}\sum |V_{t0 \to t2}|_c} < \tau_1$ and $\dfrac{\sum |V_{f0 \to f1}|_c + \varepsilon}{\sum |V_{f1 \to f2}|_c + \varepsilon} > \tau_1$ then field t3 is repeated.

Figure 19C:
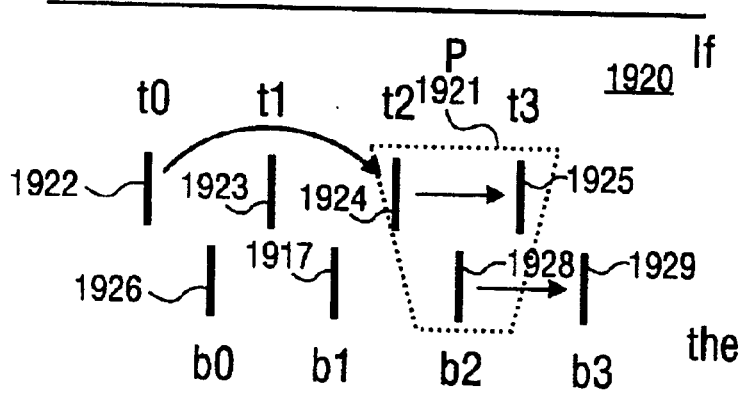

Such a situation is illustrated in FIG. 19*c*. Video sequence 1920 has a current frame 1921 with a repeated field, top fields 1922, 1923, 1924, and 1925, and bottom fields 1926, 1927, 1928, and 1929. Fields 1922, 1923, 1924, and 1925 correspond to fields t0, t1, t2, and t3 respectively. Similarly, fields 1926, 1927, 1928, and 1929 correspond to fields b0, b1, b2, and b3 respectively. Fields 1924 and 1925 are repeated, and frame 1921 is made up of fields 1924, 1925 and 1928. Because field 1925 is a repeat of field 1924, there is no need to create a set of motion vectors relating fields 1925 and 1924 other than the field motion vectors, and the encoder need only make a note that fields 1925 and 1924 are the same.

If the above equation is true, then field 1925 is a repeat of field 1924, and it can be encoded as such. Further, the encoder should begin encoding bottom-field-first, starting with field 1929.

The following equation can be used to determine if there is a repeated field in a situation in which a video sequence is operating bottom-field first, and the current frame is an I frame:

if $\dfrac{\sum |V_{b0 \to b1}|_c}{\sum |V_{b0 \to b2}|_c} < \tau_1$ and $\dfrac{\sum |V_{t0 \to t1}|_c}{\sum |V_{b0 \to b1}|_c} > \tau_2$ then field b1 is repeated.

Figure 19D:
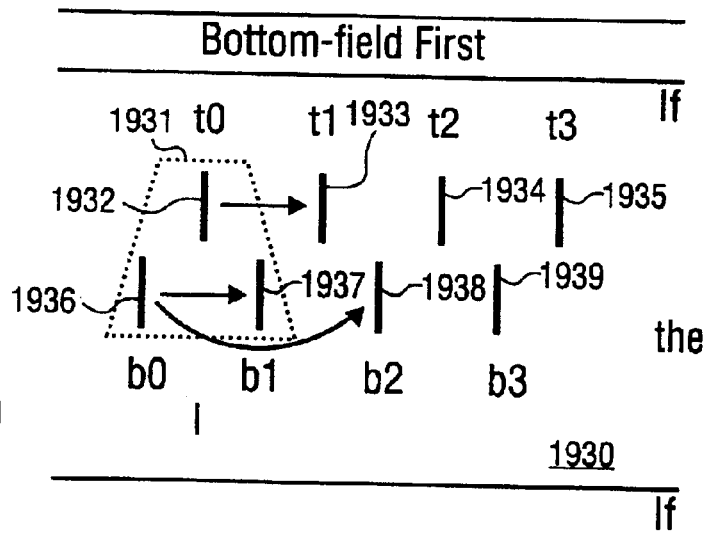

Such a situation is illustrated in FIG. 19*d*. Video sequence 1930 has a current frame 1931 with a repeated field, top fields 1932, 1933, 1934, and 1935, and bottom fields 1936, 1937, 1938, and 1939. Fields 1932, 1933, 1934, and 1935 correspond to fields t0, t1, t2, and t3, respectively. Similarly, fields 1935, 1936, 1937, and 1938 correspond to fields b0, b1, b2, and b3, respectively. Fields 1936 and 1937 are repeated, and frame 1931 is made up of fields 1932, 1936 and 1937. Because field 1937 is a repeat of field 1936, there is no need to create a set of motion vectors relating fields 1937 and 1936 other than the field motion vectors, but the encoder need only make a note that fields 1937 and 1936 are the same.

If the above equation is true, then field 1937 is a repeat of field 1936, and it can be encoded as such. Further, the encoder should begin encoding top-field-first, starting with field 1933.

The following equation can be used to determine if there is a repeated field in a situation in which a video sequence is operating bottom-field first, and the current frame is a B frame:

$$\text{if } \frac{\left|\sum |V_{b0 \to b1}|_c - \sum |V_{b0 \to b2}|_c\right|}{\sum |V_{b0 \to b1}|_c} < \tau_1,$$

$$\frac{\left|\sum |V_{t0 \to t1}|_c - \sum |V_{t0 \to t2}|_c\right|}{\left|\sum |V_{b0 \to b1}|_c - \sum |V_{b0 \to b2}|_c\right|} > \tau_2$$

and $\Sigma|V_{b0 \to b2}|_c < \Sigma|V_{t0 \to t2}|_c$ then field b2 is repeated.

Figure 19E:
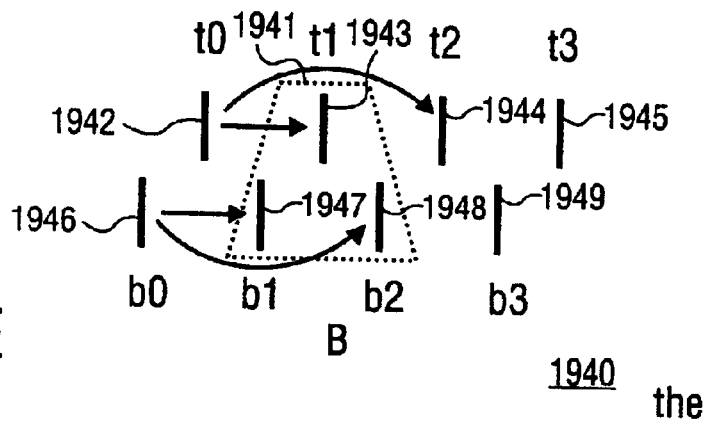

Such a situation is illustrated in FIG. 19e. Video sequence 1940 has a current frame 1941 with a repeated field, top fields 1942, 1943, 1944, and 1945, and bottom fields 1946, 1947, 1948, and 1949. Fields 1942, 1943, 1944, and 1945 correspond to fields t0, t1, t2, and t3 respectively. Fields 1946, 1947, 1948, and 1949 correspond to fields b0, b1, b2, and b3 respectively. Fields 1948 and 1947 are repeated, and frame 1941 is made up of fields 1943, 1947 and 1948. Because field 1948 is a repeat of field 1947, the encoder need only make a note that fields 1948 and 1947 are the same.

If the above equation is true, then field 1948 is a repeat of field 1947, and it can be encoded as such. Further, the encoder should begin encoding top-field-first, starting with field 1944.

The following equation can be used to determine if there is a repeated field in a situation in which a video sequence is operating bottom-field first, and the current frame is a P frame:

$$\text{if } \frac{\sum |V_{b2 \to b3}|_c}{\frac{1}{k}\sum |V_{b0 \to b2}|_c} < \tau_1 \quad \text{and} \quad \frac{\sum |V_{t2 \to t3}|_c}{\sum |V_{b2 \to b3}|_c} > \tau_2$$

then field b3 is repeated.

Figure 19F:
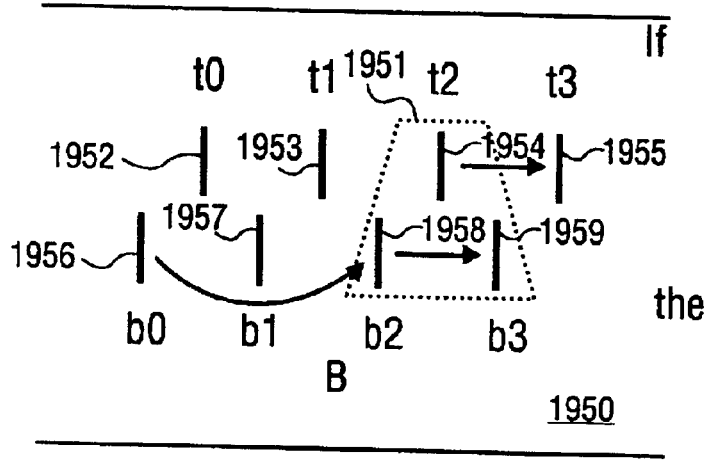

Such a situation is illustrated in FIG. 19f. Video sequence 1950 has a current frame 1951 with a repeated field, top fields 1952, 1953, 1954, and 1955, and bottom fields 1956, 1957, 1958, and 1959. Fields 1952, 1953, 1954, and 1955 correspond to fields t0, t1, t2, and t3. Similarly, fields 1956, 1957, 1958, and 1959 correspond to fields b0, b1, b2, and b3. Fields 1958 and 1959 are repeated, and frame 1951 is made up of fields 1954, 1958 and 1959. Because field 1959 is a repeat of field 1958, there is no need to create a set of motion vectors relating fields 1959 and 1958 other than the field motion vectors, but the encoder need only make a note that fields 1959 and 1958 are the same.

If the above equation is true, then field 1959 is a repeat of field 1958, and it can be encoded as such. Further, the encoder should begin encoding top-field-first, starting with field 1955.

Figure 20:
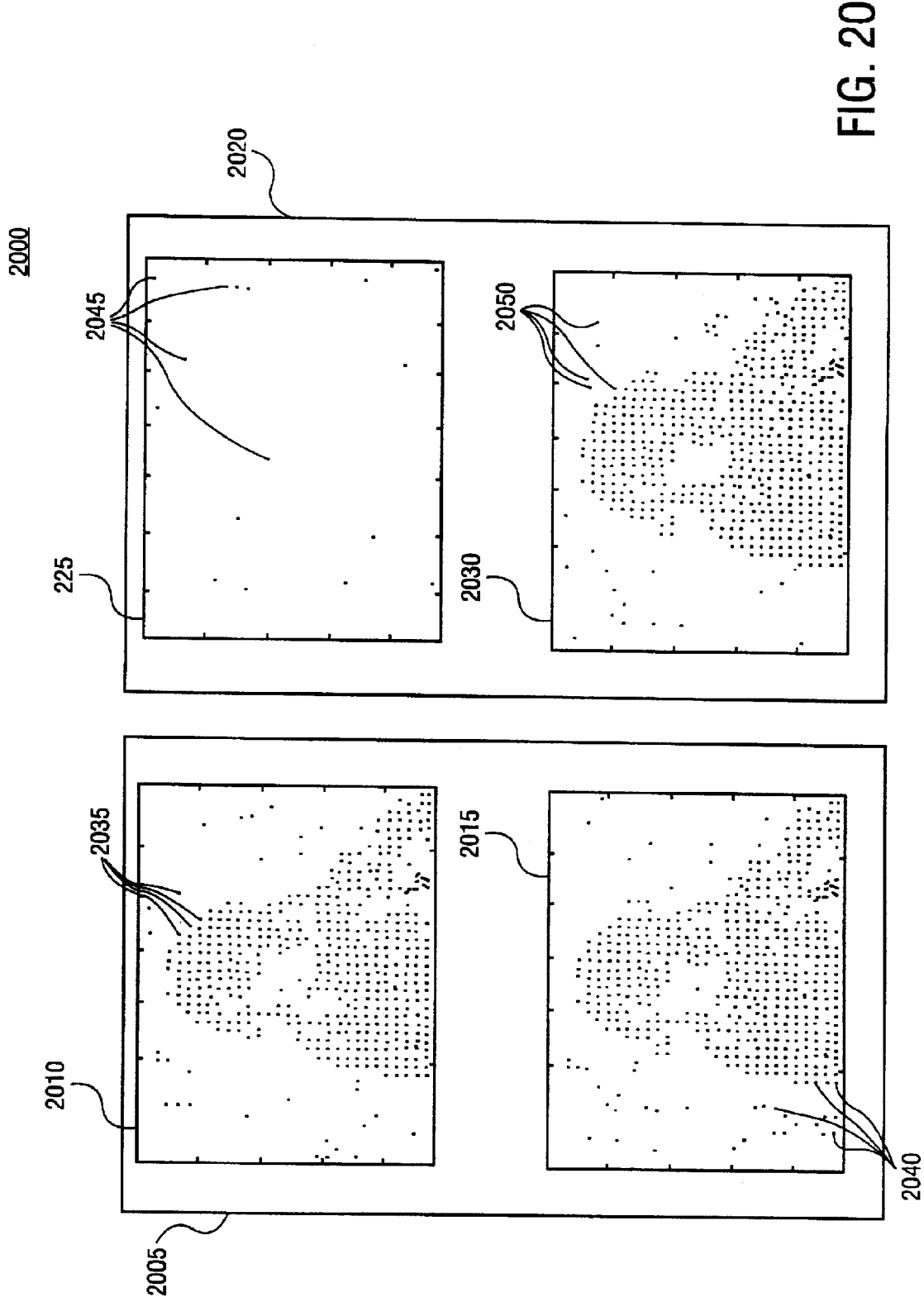
FIG. 20 illustrates two frames and their associated motion vectors according to one embodiment.

FIG. 20 illustrates two frames and their associated motion vectors according to one embodiment. Video frame 2005 comprises top field 2010 and bottom field 2015. Video frame 2020 comprises top field 2025 and bottom field 2030. Field 2010 has associated motion vectors 2035 relating field 2010 to a previous reference field with the same polarity. Similarly, field 2015 has motion vectors 2040 also relating the field to a previous reference field with the same polarity. Field 2025 has motion vectors 2045 relating field 2025 to field 2010. Finally, field 2030 has motion vectors 2050 relating field 2030 to field 2015.

Motion vectors 2035, 2040, 2045 and 2050 represent the movement of blocks of fields 2010, 2015, 2025 and 2030. Each of the fields is divided into blocks, each block comprising a certain number of pixels. The movement of a block from field to field is tracked by the motion vectors.

Field 2025 is a repeated field of field 2010. This can be determined because of the relatively small magnitude and number of motion vectors 2045 as compared to the number of and magnitude of motion vectors 2050. Because there are relatively few motion vectors 2045, this indicates that the blocks of field 2010 have not moved much relative to the blocks of field 2025 any more than can be accountable to noise. Thus, motion vectors 2045 may be used to determine whether or not field 2025 is a repeat of field 2010. Further, as above, in comparing motion vectors 2050 to motion vectors 2045, it can be determined whether field 2025 is either repeated or whether the whole frame 2020 is the same as the previous frame 2005) because there is a still image.

Figure 21:
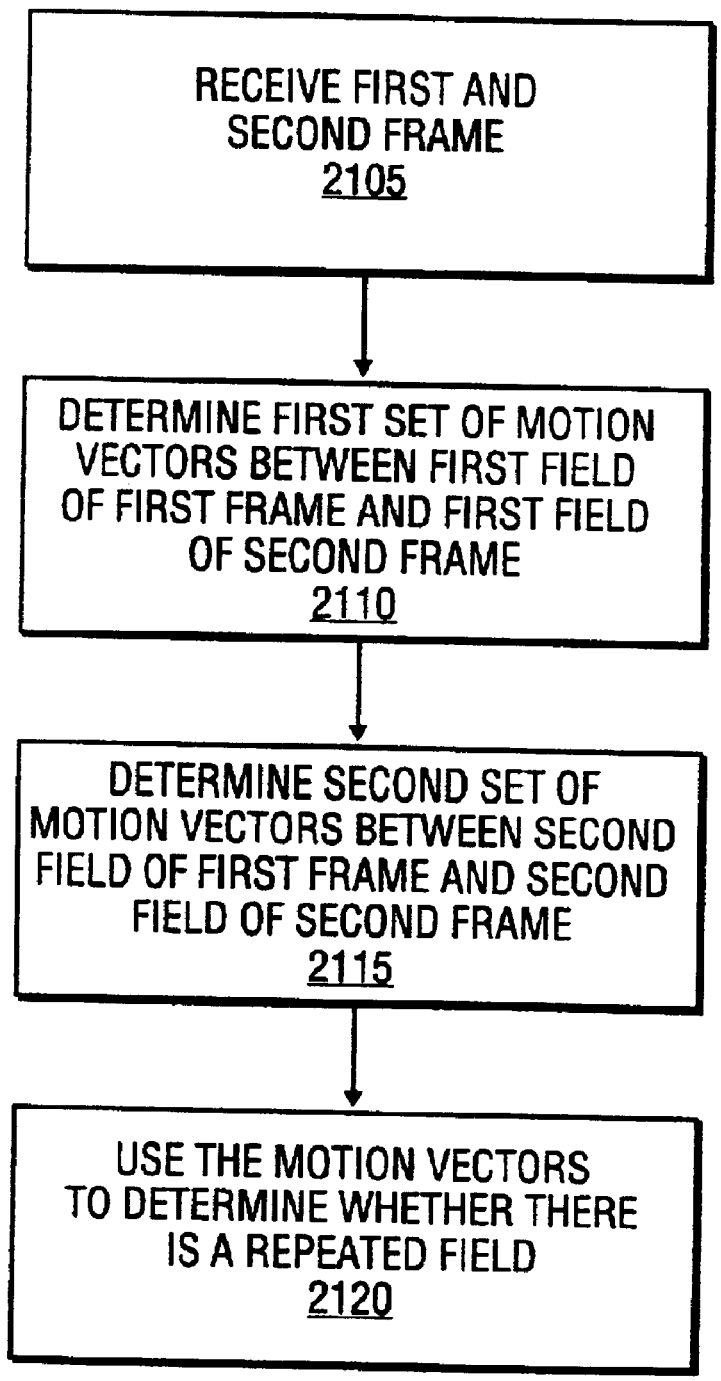
FIG. 21 is a flow diagram illustrating the process of detecting repeated fields according to one embodiment.

FIG. 21 is a flow diagram illustrating the process of detecting repeated fields according to one embodiment. This process is also known as 3:2 pull-down detection. At block 2105, a video device receives a first frame and a second frame. In one embodiment, each frame is interlaced, that is each frame is made up of two or more separate images or fields. A typical interlacing scheme has two fields for each frame, a first field and a second field, typically the first field being a top field and the second field being a bottom field, each field having alternating horizontal lines. At block 2110, a motion estimator determines a first set of motion vectors. Here, the first set of motion vectors is between the first field of the first frame and the first field of the second frame. At block 2115, a second set of motion vectors is determined between the second field of the first frame and the second field of the second frame. At block 2120, these field motion vectors are used to determine whether one of the fields in the second frame is substantially similar to the corresponding field in the first frame. The specific manner for determining the repeated fields is detailed in FIGS. 19a, 19b, 19c, 19d, 19e, and 19f. Generally, the field motion vectors can be used to determine this because if a motion vector is determined between two identical fields, then the magnitude of the resulting motion vector will theoretically be zero. However, in real-world applications there is always some noise and some difference between the fields. If one of the two sets of motion vectors has a much smaller magnitude than the other, it can be said that there is a repeated field. Since motion vectors have to be determined as part of the encoding process anyway, efficiency can be increased by using those motion vectors to determine where repeated fields are, and then those repeated fields need not be physically encoded, but rather can use a reference to the earlier field from which they were repeated.

FIGS. 22a through 24 explain a method for detecting scene changes in a video sequence according to one embodiment.

Figure 22A:
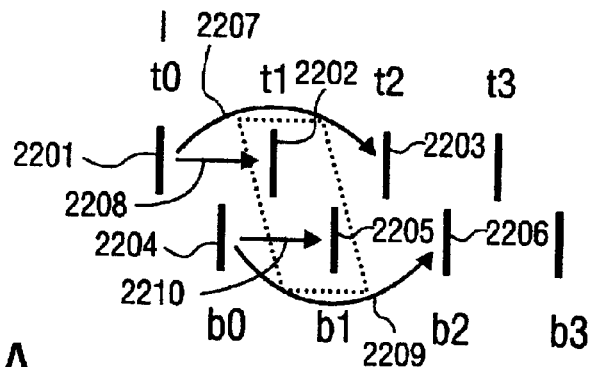
FIGS. 22a, 22b, and 22c illustrate a sequence of frames containing a scene change according to one embodiment.
Figure 22B:
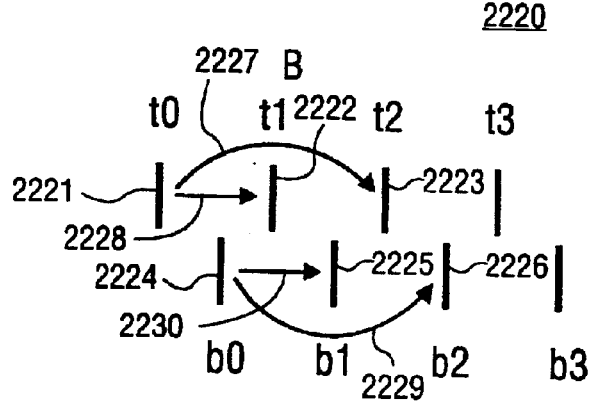
Figure 22C:
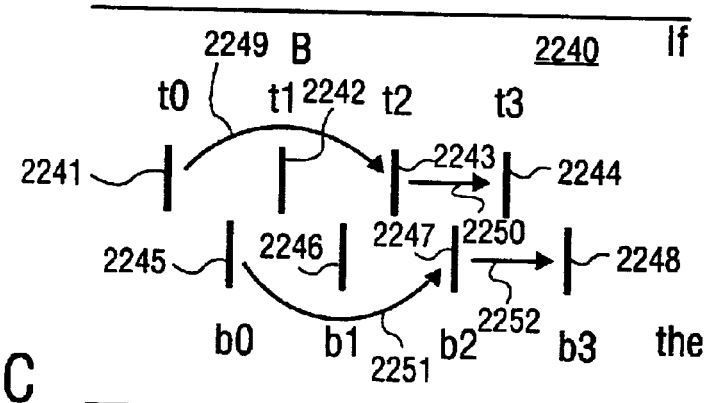

FIGS. 22a, 22b, and 22c illustrate a sequence of frames containing a scene change according to one embodiment. A scene change occurs in a video sequence where the image in the video transitions from one scene to another distinguishably distinct scene. If an encoder knows where a scene change is, the encoder can begin a new Group of Pictures (GOP) with the new scene. Current methods for detecting a scene change require burdensome amounts of computation, as well as long delays, and therefore cannot be encoded real time using many current encoders.

According to one embodiment of the present invention, a video encoder can detect scene changes using sets of motion vectors which must be estimated as part of the normal encoding process. The encoder may use two sets of motion vectors, one set relating the top field of a first frame and the top field of a second frame, and another set relating the bottom field of a first frame and the bottom field of a second frame. Because the encoder can detect a scene change using these two sets of motion vectors, if a scene change is found, the estimation of remaining three sets of motion vectors (as explained with respect to FIG. 18) and the mode decision for determining the final motion vectors, need no longer be processed, as the encoder may encode the current frame as an I frame beginning a new GOP. Thus, the encoder uses less resources than previous approaches to detect the scene change, and once the scene change is detected, more computational load can be avoided such as the mode decision for determining the best motion vector from five candidates for each corresponding data block.

In one embodiment, the following three equations determine whether a scene change has happened following I-, B-, and P-frames. The calculations for top-field-first and for bottom-field-first are the same, so the top-field-first situation is shown below. If the encoder is running in bottom-field-first, the scene change calculation can be performed by simply replacing the references in the equations to top frames with references to bottom frames, and vice versa. The variables are the same as those explained above in FIGS. 19a through 19f, with the addition of num_mblock, which refers to the number of macroblocks in a frame. The threshold is used to avoid false detection due to small motion, field/frame repetition, or a main object having a large movement.

These equations determine whether a frame following an I-frame in a top-field-first situation is the site of a scene change:

$$\text{if } \frac{\sum |V_{t0 \to t1}|_c + \varepsilon}{|\sum |V_{t0 \to t1}|_c - \sum |V_{t0 \to t2}|_c| + \varepsilon} > \tau_1,$$

$$\frac{\sum |V_{b0 \to b1}|_c + \varepsilon}{|\sum |V_{b0 \to b1}|_c - \sum |V_{b0 \to b2}|_c| + \varepsilon} > \tau_1,$$

and $\Sigma |V_{t0 \to t1}|_c > \tau_2 *$num_mblock then scene change at frame t1/b1

This situation is illustrated in FIG. 22a. Video sequence 2200 has top fields 2201, 2202, and 2203, and bottom fields 2204, 2205, and 2206. In the equations, fields 2201, 2202, and 2203 are referred to as fields t0, t1, and t2, respectively. Likewise, fields 2204, 2205, and 2206 are referred to as fields b0, b1, and b2 respectively. Set of motion vectors 2207 relates field 2203 to field 2201, set of motion vectors 2208 relates field 2202 to field 2201, set of motion vectors 2209 relates field 2206 to field 2204, and set of motion vectors 2210 relates field 2205 to field 2204. Here, if all of the above equations are satisfied, then a scene change happens at the frame comprising fields 2202 and 2205.

These equations determine whether a frame following an B-frame in a top-field-first situation is the site of a scene change:

$$\text{if } \frac{\sum |V_{t0 \to t2}|_c + \varepsilon}{\sum |V_{t0 \to t1}|_c + \varepsilon} > \tau_1, \frac{\sum |V_{b0 \to b2}|_c + \varepsilon}{\sum |V_{b0 \to b1}|_c + \varepsilon} > \tau_1$$

and $\Sigma |V_{t0 \to t2}|_c > \tau_2 *$num_mblock then scene change at t2/b2. This situation is illustrated in FIG. 22b. Video sequence 2220 has top fields 2221, 2222, and 2223, and bottom fields 2224, 2225, and 2226. In the equations, fields 2221, 2222, and 2223 are referred to as fields t0, t1, and t2, respectively. Likewise, fields 2224, 2225, and 2226 are referred to as fields b0, b1, and b2, respectively. Set of motion vectors 2227 relates field 2223 to field 2221, set of motion vectors 2228 relates field 2222 to field 2221, set of motion vectors 2229 relates field 2226 to field 2224, and set of motion vectors 2230 relates field 2225 to field 2234. Here, if all of the above equations are satisfied, then a scene change happens at the frame comprising fields 2223 and 2226.

These equations determine whether a frame following an P-frame in a top-field-first situation is the site of a scene change:

$$\text{if } \frac{\sum |V_{t2 \to t3}|_c + \varepsilon}{\sum |V_{t0 \to t2}|_c + \varepsilon} > \tau_1, \frac{\sum |V_{b2 \to b3}|_c + \varepsilon}{\sum |V_{b0 \to b2}|_c + \varepsilon} > \tau_1$$

and $\Sigma |V_{t2 \to t3}|_c > \tau_2 *$num_mblock then scene change at t3/b3

This situation is illustrated in FIG. 22c. Video sequence 2240 has top fields 2241, 2242, 2243, and 2244, and bottom fields 2245, 2246, 2247, and 2248. In the equations, fields 2241, 2242, 2243, and 2244 are referred to as fields t0, t1, t2, and t3, respectively. Likewise, fields 2245, 2246, 2247, and 2248 are referred to as fields b0, b1, b2, and b3, respectively. Set of motion vectors 2249 relates field 2243 to field 2241, set of motion vectors 2250 relates field 2244 to field 2243, set of motion vectors 2251 relates field 2247 to field 2245, and set of motion vectors 2252 relates field 2248 to field 2247. Here, if all of the above equations are satisfied, then a scene change happens at the frame comprising fields 2244 and 2248.

Figure 22D:
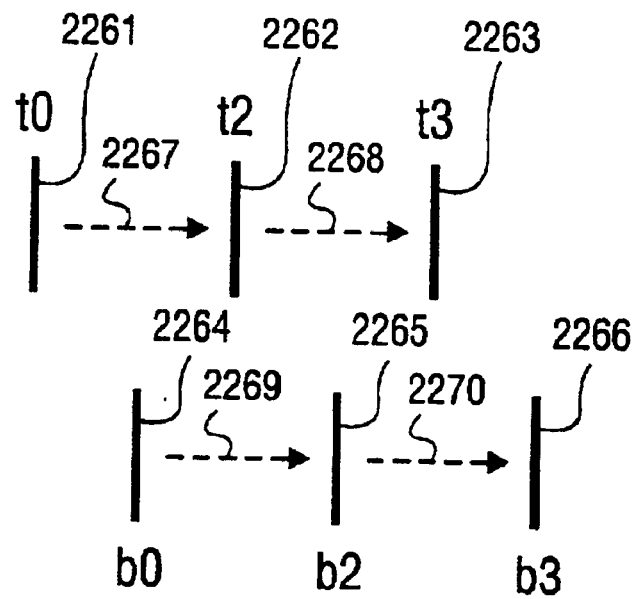
FIG. 22d illustrates an interlaced video sequence having a scene change.

FIG. 22d illustrates an interlaced video sequence having a scene change. Video sequence 2260 has top fields 2261, 2262, and 2263, and bottom fields 2264, 2265, and 2266. Set of motion vectors 2267 relates fields 2261 and 2262, set of motion vectors 2268 relates fields 2262 and 2263, set of motion vectors 2269 relates fields 2264 and 2265, and set of motion vectors 2270 relates fields 2265 and 2266. According to one embodiment, a scene change can be found in this sequence using the following equations:

$$\text{If } \frac{\Sigma |V_{t0 \to t1}|_c}{\Sigma |V_{t1 \to t2}|_c} > \tau_1 \text{ and } \frac{\Sigma |V_{b0 \to b1}|_c}{\Sigma |V_{b1 \to b2}|_c} > \tau_1$$

and $\Sigma |V_{t0 \to t1}|_c > (\tau_2 *$num_mblock) then scene change at frame t1/b1.

The above equations use the same variables as the equations in FIGS. 22a, 22b, and 22c. Here, fields 2261, 2262, and 2263 correspond to fields t0, t1, and t2 respectively. Likewise, fields 2264, 2265, and 2266 correspond to fields b0, b1, and b2, respectively. If all of the above equations are true, then there is a scene change at the frame containing fields 2262 and 2265.

Figure 22E:
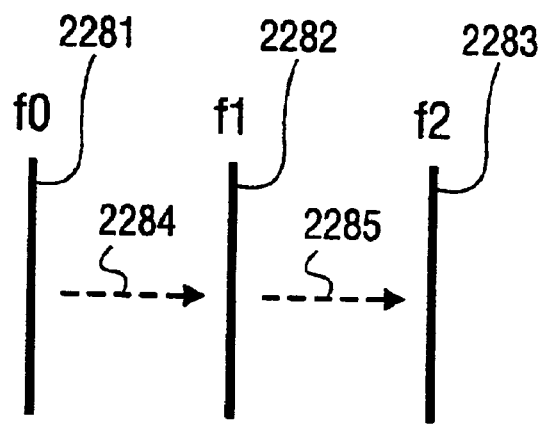
FIG. 22e illustrates a progressive video sequence having a scene change.

FIG. 22e illustrates a progressive video sequence having a scene change. In a progressive video sequence, there are no fields, only video frames. Video sequence 2280 has frames 2281, 2282, and 2283. Set of motion vectors 2284 relates fields 2281 and 2282, and set of motion vectors 2285 relates fields 2282 and 2283. According to one embodiment, a scene change can be found using the following equations:

$$\text{If } \frac{\Sigma|V_{f0 \to f1}|_c + \varepsilon}{\Sigma|V_{f1 \to f2}|_c + \varepsilon} > \tau_1$$

and $\Sigma|V_{f0 \to f1}|_c > (\tau_2 * \text{num\_mblock})$ then scene change at frame f1.

The above equations use the same variables as the equations in FIGS. 22a, 22b, and 22c, with the addition of the variables f0, f1, and f2. Frame f1 corresponds to frame 2281, frame f2 corresponds to frame 2282, and frame f3 corresponds to frame 2283. If all of the above equations are true, then there is a scene change at frame 2282.

Figure 23:
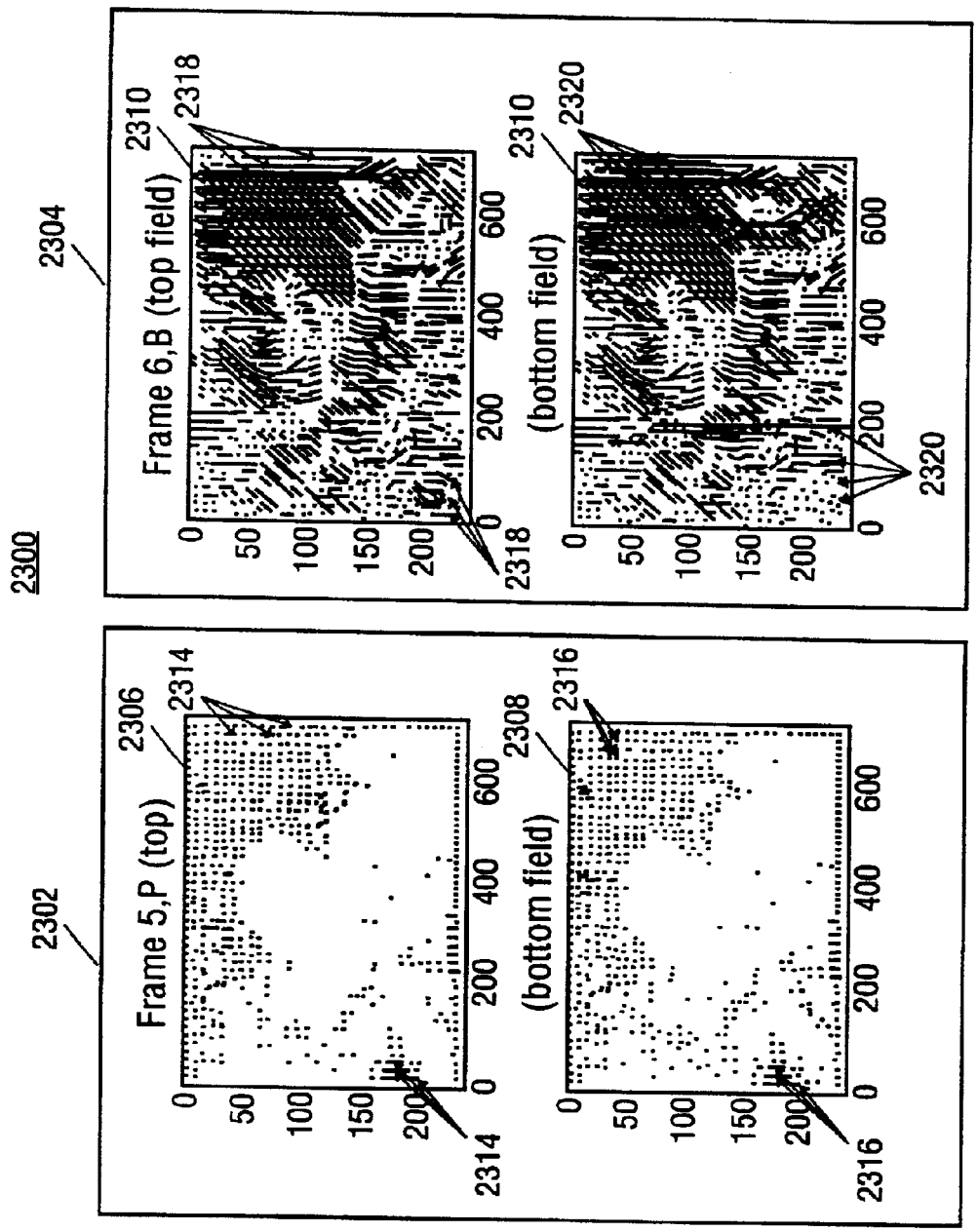
FIG. 23 illustrates two frames and their associated motion vectors according to one embodiment.

FIG. 23 illustrates sets of motion vectors in two frames in a video sequence. Frame 2302 is immediately proceeded by frame 2304. Frame 2302 is comprised of top field 2306 and bottom field 2308, and frame 2304 is comprised of top field 2310 and bottom field 2312. Motion vectors 2314 illustrate the magnitude and direction of blocks of field 2306 in relation to a reference frame immediately preceding frame 2302. Likewise, motion vectors 2316 illustrate the magnitude and direction of blocks of field 2308 in relation to a reference frame immediately preceding frame 2302. Motion vectors 2314 and 2316 are relatively small in magnitude. Thus, frame 2302 belongs to the same scene as the frame immediately preceding it.

However, examining the motion vectors 2318 and 2320 of fields 2310 and 2312, respectively, reveals that these motion vectors have magnitudes that are much larger and directions that are much more random than the motion vectors 2314 and 2316 of fields 2306 and 2308. Because motion vectors indicate the motion of blocks of one frame related to another, when there are very large and very random motion vectors for one frame, it can be concluded that that frame is not very similar to the frame from which it depends. Therefore, it can be said that there is a scene change in a frame which has motion vectors having large magnitude compared to the frame from which the current frame refers.

Figure 24:
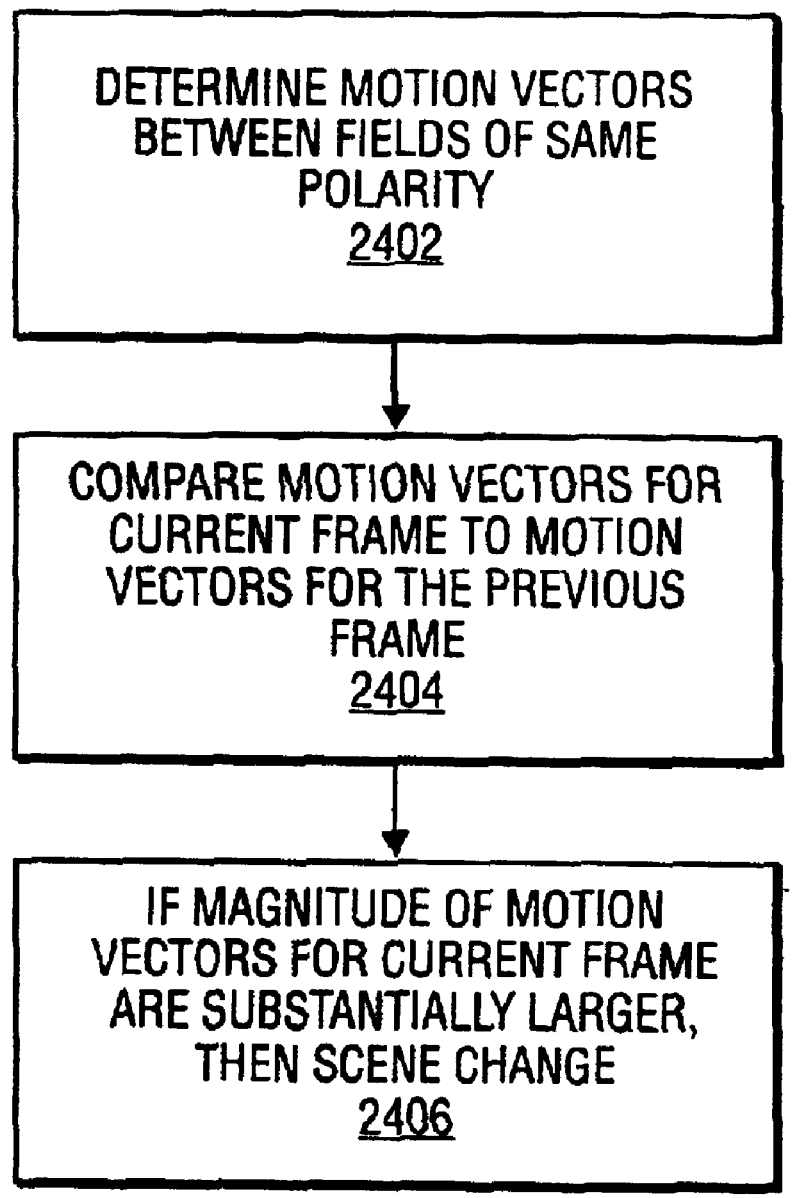
FIG. 24 is a flow diagram illustrating the process of detecting repeated fields according to one embodiment.

FIG. 24 is a flow diagram generally illustrating one embodiment of a process described above for determining whether there is a scene change. At block 2402, the motion vectors are determined for the fields of the same polarity between the current frame and the frame to which the current frame refers. At block 2404, the motion vectors for the current frame are compared to the motion vectors of the previous frame. At block 2406, if it is determined that the ratio of the magnitudes for the total sets of motion vectors of the current frame and the previous frame are greater than a threshold and the magnitudes of the motion vectors for the current frame are relatively large, then a scene change is said to occur at the current frame.

The invention has been described in conjunction with the several embodiments. It is evident that numerous alternatives, modifications, variations, and uses will be apparent to one skilled in the art in light of the forgoing description.

What is claimed is:

1. A method for encoding a video sequence comprising:
   executing a first phase of motion estimation to determine a set of field motion vectors describing a relationship between fields of same polarity in two frames;
   executing a scene change detection using the set of field motion vectors;
   executing a 3:2 pulldown detection using the set of field motion vectors if no scene change is detected; and
   executing a second phase of motion estimation to determine a set of motion vectors describing a relationship between fields of opposite polarity in the two frames and a relationship between the two frames.

2. The method of claim 1, wherein
   the set of field motion vectors comprises a first set of motion vectors between a first field of a first frame and a first field of a second frames, and a second set of motion vectors between a second field of the first frame and a second field of the second frame.

3. The method of claim 2, wherein the set of motion vectors comprises:
   a third set of motion vectors between the first field of the first frame and the second field of the second frame;
   a fourth set of motion vectors between the second field of the first frame and the first field of the second frame; and
   a fifth set of motion vectors between the first frame and the second frame.

4. The method of claim 1, further comprising:
   if the 3:2 pulldown detection detects a repeated field, removing the repeated field.

5. A video encoder comprising:
   a motion detection component having a first phase and a second phase, the first phase to determine first and second set of motion vectors describing a relationship between fields of same polarity in two frames, and the second phase to determine third and fourth sets of motion vectors describing a relationship between fields of opposite polarity in the two frames, and to determine a fifth set of motion vectors describing a relationship between the two frames;
   a scene change detection component to detect a scene change using the first and second set of motion vectors; and
   a 3:2 pulldown detection component to detect a repeated field using the first and second set of motion vectors if no scene change is detected.

6. The video encoder of claim 5, wherein the first set of motion vectors comprises motion vectors between a first field of a first frame and a first field of a second frame, and the second set of motion vectors comprises motion vectors between a second field of the first frame and a second field of the second frame.

7. The video encoder of claim 5, wherein the scene change detection component detect a scene change by comparing a ratio of the first and second motion vectors to a threshold.

8. The video encoder of claim 5, wherein the 3:2 pulldown detection component detect a repeated field by comparing a ratio of the first and second motion vectors to a threshold.

9. The video encoder of claim 8 further comprising a 3:2 pulldown undo component to compensate for finding a repeated field.

10. The video encoder of claim 9, wherein the 3:2 pulldown undo component compensates for finding a repeated field by replacing the repeated field with a reference to a field from which the repeated field is repeated.

11. The video encoder of claim 9, wherein the 3:2 pulldown undo component compensates for finding a repeated field by averaging the repeated field and a field from which the repeated field is repeated.

12. The video encoder of claim 5, wherein the encoder is embodied in a processor.

13. A computer readable medium storing executable computer program instructions which, when executed by a processor, cause the processor to perform a method comprising:

executing a first phase of motion estimation, the first phase determining a set of field motion vectors describing a relationship between fields of same polarity in two frames;

executing a scene change detection using the set of field motion vectors;

executing 3:2 pulldown detection using the set of field motion vectors if no scene change is detected; and executing second phase of motion estimation to determine a set of motion vectors describing a relationship between fields of opposite polarity in the two frames and a relationship between the two frames.

14. The computer medium of claim 13, wherein the set of field motion vectors comprises a first set of motion vectors between a first field of a first frame and a first field of a second frame and a second set of motion vectors between a second field of the first frame and a second field of the second frame.

15. The computer readable medium of claim 13, wherein the set of motion vectors comprises:

a third set of motion vectors between the first field of the first frame and the second field of the second frame;

a fourth set of motion vectors between the second field of the first frame and the first field of the second frame; and a fifth set of motion vectors between the first frame and the second frame.

16. The computer readable medium of claim 13, further comprising:

if the 3:2 pull-down detection detects a repeated field, removing the repeated field.

17. An encoding apparatus comprising:

means for estimating motion comprising first and second phase means, the first phase means for determining a set of field motion vectors describing a relationship between fields of same polarity in two frames and the second phase means for determining a set of motion vectors describing a relationship between fields of opposite polarity in the two frames and a relationship between the two frames;

means to detect a scene change using the set of field motion vectors; and means to detect a repeated field using the set of field motion vectors if no scene change is detected.

* * * * *